(12) United States Patent
Caplan et al.

(10) Patent No.: US 10,075,245 B2
(45) Date of Patent: Sep. 11, 2018

(54) APPARATUS AND METHODS FOR RECONFIGURABLE OPTICAL RECEIVERS

(71) Applicant: Massachusetts Institute of Technology, Cambridge, MA (US)

(72) Inventors: David O. Caplan, Westford, MA (US); Michael R. Watts, Hingham, MA (US); Zhan Su, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 16 days.

(21) Appl. No.: 15/148,789

(22) Filed: May 6, 2016

(65) Prior Publication Data

US 2017/0214472 A1 Jul. 27, 2017

Related U.S. Application Data

(60) Provisional application No. 62/158,687, filed on May 8, 2015.

(51) Int. Cl.
*H04J 14/02* (2006.01)
*H04B 10/06* (2006.01)
(Continued)

(52) U.S. Cl.
CPC ........... *H04B 10/677* (2013.01); *H04B 10/61* (2013.01); *H04B 10/66* (2013.01); *H04B 10/671* (2013.01);
(Continued)

(58) Field of Classification Search
CPC H04B 10/677; H04B 10/671; H04B 10/5561; H04B 10/54; H04B 10/503;
(Continued)

(56) References Cited

U.S. PATENT DOCUMENTS

| 6,014,480 A | * | 1/2000 | Baney | ................ G02B 6/29319 |
| | | | | 385/24 |
| 6,683,721 B2 | * | 1/2004 | Copner | .............. G02B 6/12007 |
| | | | | 359/279 |

(Continued)

OTHER PUBLICATIONS

International Search Reporting and Written Opinion issued by the International Searching Authority for International Application No. PCT/US16/31136, dated Jan. 24, 2017, 13 pages.
(Continued)

*Primary Examiner* — Ken N Vanderpuye
*Assistant Examiner* — Abbas H Alagheband
(74) *Attorney, Agent, or Firm* — Smith Baluch LLP

(57) ABSTRACT

An optical receiver includes a cascade of optical filtering elements, each of which selects spectral components from incoming optical signals at a wavelengths aligned to filter passbands. The selected spectral components may be optically combined to form k pairs of intermediary signals, where $k=\log_2(M)$. By comparing the k pairs of intermediary signals, k bits of a digital signal representing the incident signal may be generated. The filtering elements may be configured to perform demultiplexing and demodulation simultaneously, increasing functionality and reducing excess losses. The filtering elements may also be tuned so that the optical receiver may be reconfigured to accommodate different combinations of wavelengths and modulation formats, such as wavelength division multiplexed (WDM) on off keying (OOK), M-ary orthogonal formats including frequency shift keying (FSK) and pulse position modulation (PPM), differential phase shift keying, and hybrid combinations—providing rate and format flexibility and WDM scalability.

23 Claims, 17 Drawing Sheets

(51) Int. Cl.
| | | |
|---|---|---|
| *H04B 10/12* | (2006.01) | |
| *H04B 10/67* | (2013.01) | |
| *H04B 10/61* | (2013.01) | |
| *H04B 10/66* | (2013.01) | |
| *G02B 6/28* | (2006.01) | |
| *H04B 10/2575* | (2013.01) | |

(52) U.S. Cl.
CPC ................ *H04J 14/02* (2013.01); *G02B 6/28* (2013.01); *H04B 10/2575* (2013.01)

(58) Field of Classification Search
CPC .............. H04B 10/506; H04B 10/5051; H04B 10/50577; H04B 10/5162; H04B 10/532; H04B 10/2575; H04B 10/505; H04B 10/675; H04B 10/976; H04B 10/6972; H04J 14/02; G02B 6/2861; G02F 1/00
USPC .............. 398/79, 202, 183, 149, 83, 207, 38
See application file for complete search history.

(56) References Cited

U.S. PATENT DOCUMENTS

| | | | |
|---|---|---|---|
| 6,694,104 B1 | 2/2004 | Caplan et al. | |
| 6,807,321 B2* | 10/2004 | Madsen | G02B 6/278 385/11 |
| 6,831,779 B2 | 12/2004 | Caplan | |
| 6,882,758 B2 | 4/2005 | Betty | |
| 7,085,499 B2* | 8/2006 | Yap | G02B 6/2861 398/161 |
| 7,181,097 B2 | 2/2007 | Caplan et al. | |
| 7,233,430 B2 | 6/2007 | Caplan | |
| 7,411,726 B2 | 8/2008 | Caplan | |
| 7,414,728 B2 | 8/2008 | Caplan | |
| 7,421,168 B1* | 9/2008 | Goutzoulis | G02B 6/12007 385/50 |
| 7,587,105 B2* | 9/2009 | Ashkenazi | A61B 5/0097 385/13 |
| 8,027,587 B1* | 9/2011 | Watts | G02B 6/12007 359/107 |
| 8,073,342 B2 | 12/2011 | Caplan | |
| 8,204,386 B2* | 6/2012 | Mahgerefteh | H04B 10/5162 398/183 |
| 8,379,295 B2* | 2/2013 | Zheng | H04L 27/223 359/325 |
| 8,411,351 B2* | 4/2013 | McCallion | H04L 27/223 359/325 |
| 8,488,967 B2* | 7/2013 | Etemad | H04B 10/505 380/256 |
| 8,503,889 B2 | 8/2013 | Caplan et al. | |
| 8,886,049 B2 | 11/2014 | Caplan et al. | |
| 8,958,666 B2 | 2/2015 | Caplan et al. | |
| 9,088,371 B2* | 7/2015 | Witzens | H04B 10/64 |
| 9,100,139 B2* | 8/2015 | Schmidt | H04J 14/0276 |
| 9,264,147 B2 | 2/2016 | Caplan et al. | |
| 9,425,919 B2* | 8/2016 | Baehr-Jones | H04J 14/02 |
| 9,590,742 B2* | 3/2017 | Taylor | H04B 10/66 |
| 9,683,928 B2* | 6/2017 | Swanson | A61B 5/0066 |
| 2002/0141694 A1 | 10/2002 | Caplan et al. | |
| 2002/0167721 A1 | 11/2002 | Caplan | |
| 2003/0002099 A1* | 1/2003 | Sayyah | H04B 10/25752 398/79 |
| 2003/0090767 A1* | 5/2003 | Yap | G02B 6/2861 398/183 |
| 2004/0228635 A1* | 11/2004 | Price | H04B 10/2575 398/149 |
| 2006/0008272 A1* | 1/2006 | Abeles | H04B 10/2575 398/48 |
| 2006/0139735 A1 | 6/2006 | Caplan | |
| 2006/0274320 A1 | 12/2006 | Caplan | |
| 2007/0216988 A1 | 9/2007 | Caplan | |
| 2008/0193133 A1* | 8/2008 | Krug | G02B 6/12007 398/83 |
| 2008/0285977 A1 | 11/2008 | Caplan | |
| 2009/0148171 A1* | 6/2009 | Chen | H04B 10/675 398/208 |
| 2010/0091990 A1* | 4/2010 | Etemad | H04J 14/005 380/256 |
| 2010/0111540 A1 | 5/2010 | Caplan et al. | |
| 2011/0170171 A1* | 7/2011 | McCallion | H04B 10/677 359/325 |
| 2011/0235667 A1* | 9/2011 | Fukuda | H01S 5/026 372/50.11 |
| 2011/0274429 A1 | 11/2011 | Caplan et al. | |
| 2012/0063788 A1 | 3/2012 | Caplan | |
| 2012/0182552 A1* | 7/2012 | Heidrich | G01N 21/7746 356/364 |
| 2012/0269523 A1* | 10/2012 | McCallion | H04B 10/677 398/202 |
| 2012/0281990 A1* | 11/2012 | Caplan | H04B 10/67 398/207 |
| 2013/0318325 A1* | 11/2013 | Beausoleil | G06E 3/00 712/30 |
| 2014/0016943 A1 | 1/2014 | Caplan et al. | |
| 2014/0064734 A1* | 3/2014 | Witzens | H04B 10/64 398/79 |
| 2014/0314406 A1* | 10/2014 | Zerbe | H04J 14/02 398/38 |
| 2014/0376921 A1* | 12/2014 | Goutzoulis | H04B 10/90 398/116 |
| 2015/0104176 A1* | 4/2015 | Baehr-Jones | H04J 14/02 398/79 |
| 2016/0043800 A1 | 2/2016 | Kingsbury et al. | |
| 2016/0134377 A1 | 5/2016 | Caplan et al. | |
| 2016/0329983 A1* | 11/2016 | Baehr-Jones | H04J 14/02 |
| 2017/0139236 A1* | 5/2017 | Cao | G02F 1/011 |

OTHER PUBLICATIONS

Caplan, D. O., et al. "Parallel Direct Modulation Laser Transmitters for High-speed High-sensitivity Laser Communications," in Conference on Lasers and Electro-Optics (CLEO), Postdeadline Paper PDPB12, (2011).

Caplan, D. O., et al. "Power-efficient Noise-insensitive Optical Modulation for High-sensitivity Laser Communications," Conference on Lasers and Electro-Optics (CLEO) 2014, Paper SM4J.6.

Caplan, D. O., et al. "WDM Laser Transmitters for Mobile Free-space Laser Communications," Proc. of SPIE, vol. 9739, pp. 1-11, (2016).

Caplan, D. O., et al. "WDM Laser Transmitters for Mobile Free-space Laser Communications," SPIE Photonics West, Paper 9739-30, pp. 1-33, Feb. 2016.

Chu, S.T., et al. "Cascaded Microring Resonators for Crosstalk Reduction and Spectrum Cleanup in Add-Drop Filters," IEEE Photonics Technology Letters, vol. 11, No. 11, pp. 1423-1425, Nov. 1999.

Ding, Yunhong, et al. "Multi-Channel 40 Gbit/s NRZ-DPSK Demodulation Using a Single Silicon Microring Resonator," Journal of Lightwave Technology, vol. 29, No. 5, pp. 677-684, Mar. 2011.

Ding, Yunhong, et al. "Multi-Channel WDM RZ-to-NRZ format conversion at 50 Gbit/s based on single silicon microring resonator," Optical Society of America, vol. 18, No. 20, pp. 21121-21130, Sep. 2010.

Galler, N., et al. "Integrated optical attenuator based on mechanical deformation of an elastomer layer," Appl. Phys. B, 104:931-34, Jul. 2011.

Garner, S.M., et al. "Variable Optical Attenuator for Large-Scale Integration," IEEE Photonics Technology Letters, vol. 14, No. 11, pp. 1560-1562, Nov. 2002.

Fontaine, N.K., et al. "Continuously Tunable Optical Buffering at 40 Gb/s for Optical Packet Switching Networks," Journal of Lightwave Technology, vol. 26, No. 23, pp. 3776-3783, Dec. 2008.

Hagness, S.C., et al. "FDTD Microcavity Simulations: Design and Experimental Realization of Waveguide-Coupled Single-Mode Ring and Whispering-Gallery-Mode Disk Resonators," Journal of Lightwave Technology, vol. 15, No. 11, pp. 2154-2165, Nov. 1997.

(56) References Cited

OTHER PUBLICATIONS

Lee, Ming-Chang M., et al. "A Reconfigurable Add-Drop Filter Using MEMS-Actuated Microdisk Resonator," IEEE, pp. 67-68, (2005).

Lipson, M. "Guiding, Modulating, and Emitting Light on Silicon—Challenges and Opportunities." Journal of Lightwave Technology, vol. 23, No. 12, pp. 4222-4238, Dec. 2005.

Little, B.E., et al. "Very High-Order Microring Resonator Filters for WDM Applications," IEEE Photonics Technology Letters, vol. 16, No. 10, pp. 2263-2265, Oct. 2004.

Little, B.E., et al. "Microring Resonator Channel Dropping Filters," Journal of Lightwave Technology, vol. 15, No. 6, pp. 998-1005, Jun. 1997.

Little, B.E., et al. "Ultra-Compact Si—$SiO_2$ Microring Resonator Optical Channel Dropping Filters," IEEE Photonics Technology Letters, vol. 10, No. 4, pp. 549-551, Apr. 1998.

Littler, I.C., et al. "Adjustable bandwidth dispersionless bandpass FBG optical filter," Optical Society of America, vol. 13, No. 9, pp. 3397-3407, May 2005.

Ng, S., et al. "Bend loss attenuator by carrier injection in InGaAsP/InP," Electronics Letters, vol. 41, No. 24, Nov. 2005.

Spector, S.J., et al. "Silicon Photonic Filters for Compact High Extinction Ratio Power Efficient (CHERPe) Transmitters," Conference on Lasers and Electro-optics (CLEO), May 2015.

Su, Z., et al. "An on-chip partial drop wavelength selective broadcast network," in CLEO, (2014).

Su, Z., et al. "Silicon wavelength-selective partial-drop broadcast filter bank," Opt. Lett., vol. 39, No. 18, pp. 5459-5462, Sep. 2014.

Su, Z., et al. "Wavelength Routing and Multicasting Network in Ring-Based Integrated Photonics," Integrated Photonics Research, Silicon and Nanophotonics (IPR), accepted 2015. 3 pages.

Su, Z., et al., "Second-Order Wavelength-Selective Partial-Drop Multicast Filter Bank," in Advanced Photonics 2016 (IPR, NOMA, Sensors, Networks, SPPCom, SOF), OSA technical Digest (online) (Optical Society of America, Jul. 18-20, 2016), paper ITu1B.7.

Van, V. et al. "Silicon Photonic Microring Components for On-chip WDM Networks," IEEE 6th International Conference on Advanced Infocomm Technology (ICAIT) Location: Hsinchu, Taiwan (Jul. 6-9, 2013) 3 pages.

Watts, M.R., et al. "Microring-resonator filter with doubled free-spectral-range by two-point coupling," Optical Society of America, 2003.

Xia, Fengnian, et al. "Ultra-compact high order ring resonator filters using submicron silicon photonic wires for on-chip optical interconnects," Optical Society of America, vol. 15, No. 19, pp. 11934-11941, Sep. 2007.

Xiao, Shijun, et al. "Multiple-channel silicon micro-resonator based filters for WDM applications," Optical Society of America, vol. 15, No. 12, pp. 7489-7498, Jun. 2007.

Xiong, Meng, et al. "Simultaneous RZ-OOK to NRZ-OOK and RZ-DPSK to NZ-DPSK format conversion in a silicon microring resonator," Optical Society of America, vol. 20, No. 25, pp. 27263-27272, Nov. 2012.

Xu, Qianfan, et al. "Cascaded silicon micro-ring modulators for WDM optical interconnection," Optical Society of America, vol. 14, No. 20, pp. 9430-9435, Oct. 2006.

Xu, Lin, et al. "DPSK Transmission Through Silicon Microring Switch for Photonic Interconnection Networks," IEEE Photonics Technology Letters, vol. 23, No. 16, pp. 1103-1105, Aug. 2011.

Zhang, Lin, et al. "Microring-based modulation and demodulation of DPSK signal," Optical Society of America, vol. 15, No. 18, pp. 11564-11569, Aug. 2007.

\* cited by examiner

Partial drop + heater to modulate the resonant wavelength

| M | k, [bits] | # Demod Detectors | # Comparators | Intrinsic IL [dB] | # Demod Filters | Optical RX Sensitivity Estimate @ 1 0E-9 BER | | Config #1 | | Config #2 | | Config #3 | | Config #4 | | Config #5 | |
|---|---|---|---|---|---|---|---|---|---|---|---|---|---|---|---|---|---|
| | | | | | | PPB, [dB] | ΔPPB, [dB] | r | w | r | w | r | w | r | w | r | w |
| 1 | 1 | 1 | 1 | 0 | 1 | 15.8 | -0.2 | | | | | | | | | | |
| 2 | 1 | 2 | 1 | 0.0 | 2 | 16.0 | 0.0 | 0 | 1 | | | | | | | | |
| 4 | 2 | 4 | 2 | 3.0 | 8 | 13.2 | -2.8 | 2 | 1 | 0 | 1 | 0 | 2 | | | | |
| 8 | 3 | 6 | 3 | 4.8 | 24 | 11.5 | -4.5 | 4 | 1 | 2 | 2 | 0 | 3 | | | | |
| 16 | 4 | 8 | 4 | 6.0 | 64 | 10.4 | -5.6 | 8 | 1 | 4 | 2 | 4 | 4 | 0 | 4 | | |
| 32 | 5 | 10 | 5 | 7.0 | 160 | 9.6 | -6.4 | 16 | 1 | 8 | 2 | 8 | 4 | 0 | 5 | | |
| 64 | 6 | 12 | 6 | 7.8 | 384 | 8.9 | -7.1 | 32 | 1 | 16 | 2 | 16 | 4 | 8 | 8 | 0 | 6 |

*FIG. 5*

APPARATUS AND METHODS FOR RECONFIGURABLE OPTICAL RECEIVERS

CROSS-REFERENCES TO RELATED APPLICATIONS

This application claims priority to U.S. provisional application Ser. No. 62/158,687, filed May 8, 2015, entitled "INTEGRATED WDM LASERCOM TRANSCEIVERS AND RECONFIGURABLE WDM OPTICAL RECEIVERS," which is hereby incorporated herein by reference in its entirety.

GOVERNMENT SUPPORT

This invention was made with Government support under Contract No. FA8721-05-C-0002 awarded by the U.S. Air Force. The Government has certain rights in the invention.

BACKGROUND

The parallelization of optical communications using wavelength division multiplexing (WDM) has led to tremendous increases in fiber-optic channel capacity over the past decade. A WDM system usually employs multiple optical signals, each of which is assigned a particular signal wavelength. These optical signals are typically multiplexed to form a group of WDM optical signals that include a mixture of signals from each individual optical signal, transmitted over a single waveguide, and then demultiplexed such that each optical signal wavelength is individually routed to a designated receiver.

WDM technologies can leverage the vast available spectrum of optical channels which exceed many THz. The optical channels may include guided channels such as integrated waveguide and fiber optic channels, and unguided channels, such as free space optical (FSO) channels. Each optical signal may use a manageable amount of bandwidth (e.g., GHz-class) that may, in practice, be generated with available electronics.

Many applications of WDM may benefit from implementations that have small size, low weight, and low power consumption (SWAP). For example, space-based communications, such as those over distances exceeding 1000 km, are usually power-starved, therefore simple low-SWAP receiver (RX) implementations with good sensitivity are desirable since they reduce the burden on the power-starved transmitter (TX) on the other end of the link. In addition, improvements in RX sensitivity may provide more link margin, extend link distances, and enable lower-power TXs, which have an added benefit of reducing nonlinear impairments. Such features are generally attractive to both fiber-optic guided and FSO applications. Furthermore, it would also be beneficial in space-based applications to have reconfigurable WDM receivers that may be used to demultiplex and/or demodulate signals modulated at different wavelengths or using different modulation schemes (e.g., multiple frequency-shift keying or differential phase-shift keying), and support varying data rates. In this case, the receiver in space may accommodate changes of transmitting conditions, link distances, and channel losses, and interoperate with a variety of different TX sources, providing versatility and WDM scalability. These characteristics are particularly useful for space-based FSO applications where launch costs are expensive and the performance and agility may provide significant value.

SUMMARY

Embodiments of the present invention include apparatus, systems, and methods of demultiplexing and demodulating signals. In one example, a demodulator includes an input waveguide to receive a wavelength division multiplexed (WDM) input signal. A first plurality of filtering elements is optically coupled to the input waveguide to couple out of the input waveguide, at a first split ratio substantially equal to or less than 0.5, light at each of a first plurality of possible wavelengths in the WDM input signal. A first detector is optically coupled to the first plurality of filtering elements to generate a first detector signal in response to the light coupled out of the input waveguide by the first plurality of filtering elements. The demodulator also includes a second plurality of filtering elements, optically coupled to the input waveguide, to couple out, at the first split ratio, light at each of a second plurality of possible wavelengths in the WDM input signal, the second plurality of possible wavelengths being different than the first plurality of possible wavelengths. A second detector is optically coupled to the second plurality of filtering elements to generate a second detector signal in response to the light coupled out of the input waveguide by the second plurality of filtering elements. A first comparator is operably coupled to the first detector and the second detector to generate a first bit of a demodulated signal of the WDM input signal based on a comparison of the first detector signal and the second detector signal.

In another example, a method of demodulating a wavelength-division multiplexed (WDM) input signal includes coupling the WDM input signal into an input waveguide. The method also includes coupling out, at a first split ratio, light at each of a first plurality of possible wavelengths in the WDM input signal using a first plurality of filtering elements optically coupled to the input waveguide. A first detector signal is generated in response to the light coupled out of the input waveguide by the first plurality of filtering elements. The method also includes coupling out, at the first split ratio, light at each of a second plurality of possible wavelengths in the WDM input signal using a second plurality of filtering elements optically coupled to the input waveguide. The second plurality of possible wavelengths is different than the first plurality of possible wavelengths. A second detector signal is generated in response to the light coupled out of the input waveguide by the second plurality of filtering elements. The method also includes generating a first bit in a demodulated signal based at least in part on comparing the first detector signal and the second detector signal.

In yet another example, an apparatus for demodulating an input signal is disclosed. The Input signal includes a first component at a first wavelength $\lambda_1$, a second component at a second wavelength $\lambda_2$, a third component at a third wavelength $\lambda_3$, and a fourth component at a fourth wavelength $\lambda_4$. The apparatus includes an input waveguide to receive the input signal. The apparatus also includes a first module to generate a first bit of a demodulated signal and a second module to generate a second bit of the demodulated signal. The first module includes a first filtering element resonating at $\lambda_1$ and a second filtering element resonating at $\lambda_2$, optically coupled to the input waveguide, to couple out a portion of the first component and the second component. The first module also includes a third filtering element resonating at $\lambda_3$ and a fourth filtering element resonating at $\lambda_4$, optically coupled to the input waveguide, to couple out a portion of a third component and the fourth component. A first comparator generates the first bit of the demodulated signal based at least in part on comparing the first plurality of possible spectral components with the second plurality of possible spectral components. The second module includes a fifth ring resonator resonating at $\lambda_1$ and a sixth ring resonator resonating at $\lambda_3$, optically coupled to the input waveguide, to couple out a portion of a third plurality of possible spectral components in the input signal. The second module also includes a seventh filtering element resonating at $\lambda_2$ and an eighth filtering element resonating at $\lambda_4$, optically coupled to the input waveguide, to couple out a portion of a fourth plurality of possible spectral components in the input signal. A second comparator generates the second bit of the demodulated signal based at least in part on comparing the third plurality of possible spectral components with the fourth plurality of possible spectral components.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 5 is a table summarizing performance of a filter element-based optical receiver for signals modulated with different numbers of orthogonal frequencies.

DETAILED DESCRIPTION

Reconfigurable Optical Receivers Using Ring Resonators

Figure 1:
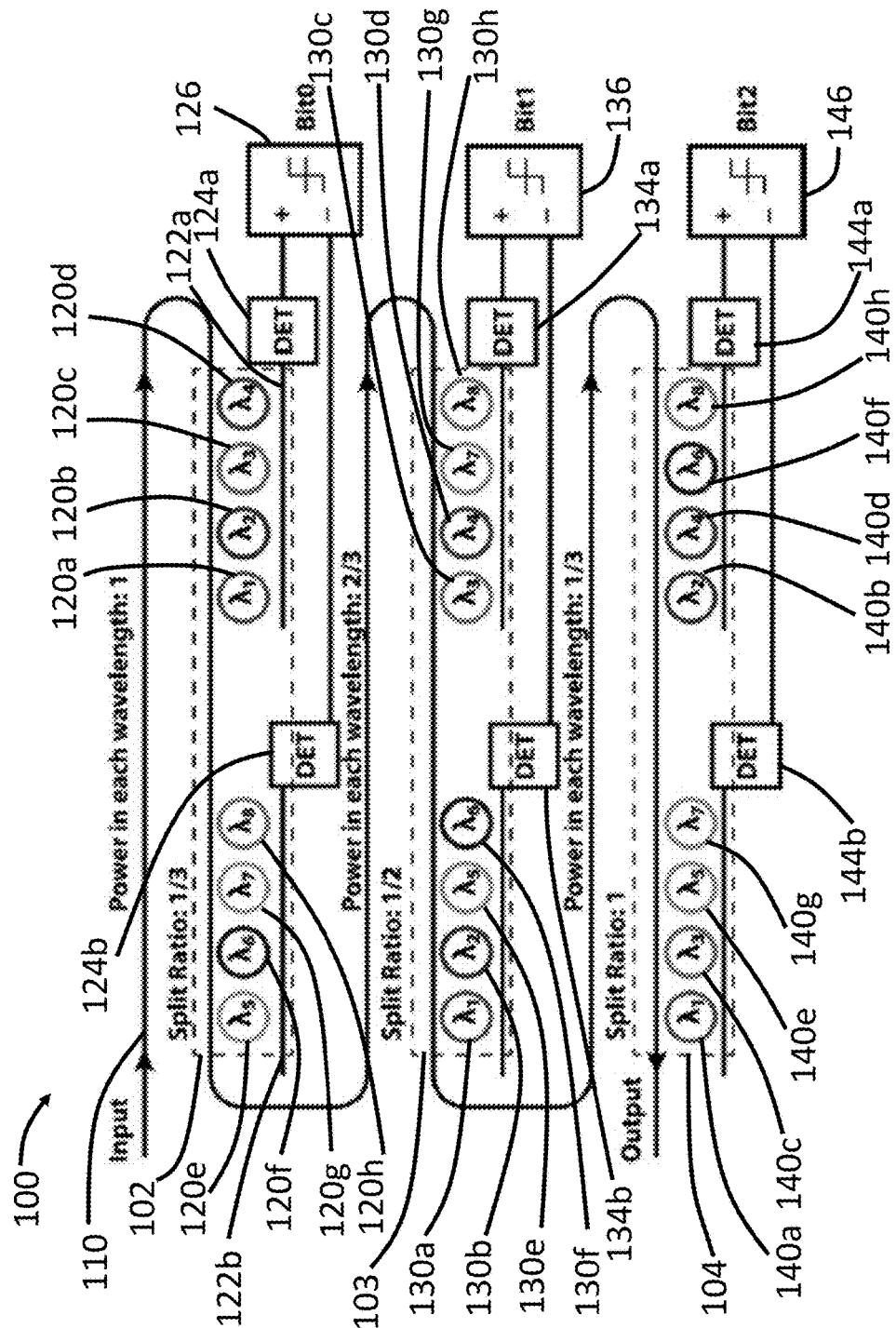
FIG. 1 shows a schematic of an optical receiver using ring resonator based filtering elements for demultiplexing and demodulation.

When receiving incident M-FSK optical signals (i.e., modulated with M carrier wavelengths), conventional receivers may use WDMs to direct the spectral component at each wavelength in the M carrier wavelengths into a separate detector, followed by M-to-1 winner-take-all analog comparison circuitry to determine which optical channel has the largest amplitude so as to reconstruct the coded information in the incident signals. However, the analog comparison circuitry may be difficult to implement at GHz rates, which may be desirable in high-capacity communications. Alternatively, a conventional receiver may use M analog-to-digital convertors (ADCs) to digitally sample each of the separately detected WDM-demultiplexed signals, and the digital outputs may be digitally compared to find the optical channel having the largest amplitude and performing the winner-take-all function. While this approach may be conceptually straightforward, high-speed ADCs are typically power hungry, expensive, and become increasingly challenging to implement at high GHz-class sample rates.

To reduce the size, weight, and power consumption (SWAP) of optical receivers, and provide useful reconfigurable modes of operation, apparatus and methods described herein employ an approach based on partial drop filtering elements, each of which may couple out spectral components at a wavelength matching the pass-band of the filtering element. Through this application, a filtering element may be defined as having an input, a wavelength-dependent thru port (also referred to as transmission port, with transfer function $T(\lambda)$), and one or more drop ports (with transfer functions $R(\lambda)$). For a filtering element with loss (L), conservation of energy may be expressed as T+R+L=1 (where R=sum($R_i$)). Examples of filtering elements include ring resonator filters (ring resonators), in which case the operation wavelength of the filtering element may be substantially equal to the resonant wavelength of the ring resonator. Ring resonator filters may also include 1 or more rings, which may be tuned to adjust the net filtering element transfer function. For example, high-order ring resonators may be configured to make wider passbands and steeper transitions to the reject band as well as better out-of-band rejection. Other examples of filtering elements include Mach-Zehnder interferometers (MZIs), unbalanced MZIs, and cascaded and networked combinations of MZI and ring resonator filters.

The spectral components coupled out by the filtering elements are then optically combined (also referred to as aggregation) to form k pairs of intermediary signals, where k=$\log_2$(M). The general approach to decide the "aggregation" of the wavelengths can be through a Boolean truth table that maps the incoming orthogonal symbol set to the logical output data. More information of aggregation may be found in U.S. Patent Application Publication No. 2012/0281990 A1, which is hereby incorporated herein by reference in its entirety.

In each pair of intermediary signals, one intermediary signal usually includes a sum of spectral components at half of the carrier wavelengths within the WDM wavelength band that comprise the symbol set, while the other intermediary signal includes a sum of spectral components at the other half of the carrier wavelengths within the WDM wavelength band that comprise the symbol set. By comparing the k pairs of intermediary signals in this manner, k bits of a digital signal representing the symbol carried by the incident optical signal may be derived, thus performing the demodulation function.

In the detailed description below, ring resonators are used for the partial drop filtering elements for illustrating purposes. In practice, any other filtering elements as described in above paragraphs may also be used. The receiver described herein may include a cascaded series of tunable partial-drop optical filters that perform both wavelength-dependent optical filtering and routing. By tuning the ring resonator to resonate at different wavelengths, the receiver may be reconfigured to demultiplex and demodulate signals modulated and multiplexed using different schemes. The receiver may also incorporate tunable null-wavelength rejection filters to improve reconfigurability without degrading performance. The rejection filters may include ring resonators having tunable wavelengths, at least one of which is not one of the incoming optical signal carrier wavelengths. Therefore, noise at this wavelength may be coupled out of the receiver.

Because the ring resonators may perform both demultiplexing and demodulation, the receiver has lower loss, a smaller footprint, and fewer components, thereby reducing the SWAP of the receiver. The reconfigurability of the receiver also allows convenient adaption to different modulation schemes (e.g., M-ary frequency shift keying (M-FSK) for various M, WDM on off keying (OOK), combinations of WDM and M-FSK, M-ary pulse position modulation (M-PPM), hybrid M-orthogonal FSK/PPM, WDM-DPSK, etc.) that may provide flexibility, sensitivity, and scalability which are characteristics that are particularly attractive for FSO and space-based applications.

FIG. 1 shows a schematic of an optical receiver using ring resonators for demultiplexing and demodulation. An 8-ary frequency shifted keying (FSK) signal is used for illustrating the approach, but other modulation schemes may also be used. The receiver 100 includes an input waveguide 110 to receive an incident signal, which may include 8 multiplexed spectral components at carrier wavelengths $\lambda_1, \lambda_2 \ldots$ to $\lambda_8$. A first sequence of eight ring resonators 120a, 120b ... to 120h (collectively referred to as ring resonators 120) are evanescently coupled to the input waveguide 110 to couple out different spectral components in the incident signal. Each ring resonator 120 has a resonant wavelength corresponding to one of the carrier wavelengths $\lambda_1, \lambda_2 \ldots$ to $\lambda_8$.

The first sequence of ring resonators 120 is further divided into two groups. The first group includes ring resonators 120a, 120b, 120c, and 120d, having resonant wavelengths $\lambda_1, \lambda_2, \lambda_3$, and $\lambda_4$, respectively, and is evanescently coupled to a common output waveguide 122a. A detector 124a is disposed at the end of the output waveguide 122a to detect spectral components at wavelengths $\lambda_1, \lambda_2, \lambda_3$, and $\lambda_4$ that are coupled out from the incident signal by the first group of ring resonators 120a to 120d. The second group includes ring resonators 120e, 120f, 120g, and 120h, having resonant wavelengths $\lambda_5, \lambda_6, \lambda_7$, and $\lambda_8$, respectively, and is evanescently coupled to another common output waveguide 122b. Another detector 124b is disposed at the end of the output waveguide 122b to detect spectral components at wavelengths $\lambda_5, \lambda_6, \lambda_7$, and $\lambda_8$ that are coupled out from the incident signal by the first group of ring resonators 120e to 120h. A comparator 126 is coupled to the two detectors 124a and 124b to generate the first bit (i.e., bit 0) of the demodulated digital signal of the incident signal based on the relative amplitudes of the signals from the two detectors 124a and 124b.

The first sequence of ring resonators 120, the portion of the input waveguide 110 evanescently coupled to the first sequence of ring resonators 120, and the two output waveguides 122a and 122b form a partial drop filter bank 102, as indicated by the dashed rectangle in FIG. 1. Each individual ring resonator 120a to 120h, together with its respective input waveguide 110 and output waveguide 122a or 122b, may form an individual partial drop filter in the partial drop filter bank 102 and couple out only a portion of the spectral component at the resonant wavelength of the individual ring resonator. For example, the ring resonator 120a show in FIG. 1 may couple out about one third (i.e., ⅓) of the spectral components at $\lambda_1$ from the input waveguide 110 to the output waveguide 122a. Each ring resonator in the first sequence of ring resonators 120 may have the same split ratio so as to allow reliable comparison at the comparator 126.

To fine tune the power directed to the output waveguide 122a, the filter may be slightly detuned. This can provide a means of reducing the power coupled to the output waveguide 122a for each wavelength without using additional attenuating elements. As long as the filter bandwidth is large relative to the optical signal bandwidth and detuning amount, this approach to balancing the optical powers directed to the comparison detectors may be used to with little effect on the optical signal waveforms (i.e., waveform shape and crosstalk) other than the average signal power. The split ratio of the first partial drop filter bank 102 may depend on, for example, the total number of partial drop filter banks in the receiver 100. If the receiver 100 includes N partial drop filter banks, the split ratio at the first partial drop filter bank may be 1/N, which enables the incoming optical signal power to be evenly distributed N filter banks.

The receiver 100 shown in FIG. 1 also includes a second partial drop filter bank 103 to generate the second bit (i.e., bit 1) of the demodulated digital signal of the incident signal. The second partial drop filter bank 103 is coupled in series with the first partial drop filter bank 102 and couples out a portion of the residual incident signal after the first partial drop filter bank 102. In the receiver 100 shown in FIG. 1, the residual incident signal includes about ⅔ of the power of the original incident signal. The second partial drop filter bank 103 includes a second sequence of ring resonators 130a, 130b . . . to 130h (collectively referred to as ring resonators 130), which is further divided into two groups. The first group includes ring resonators 130c, 130d, 130g, and 130h having resonant wavelengths at $\lambda_3$, $\lambda_4$, $\lambda_7$, and $\lambda_8$, respectively, and the second group includes ring resonators 130a, 130b, 130e, and 130f having resonant wavelengths at $\lambda_1$, $\lambda_2$, $\lambda_5$, and $\lambda_6$, respectively. Spectral components at $\lambda_3$, $\lambda_4$, $\lambda_7$, and $\lambda_8$ are coupled out to an output waveguide 132a and detected by a detector 134a and spectral components at $\lambda_1$, $\lambda_2$, $\lambda_5$, and $\lambda_6$ are coupled to another output waveguide 132b and detected by another detector 134b. A second comparator 136 in the receiver 100 receives signals acquired by the two detectors 134a and 134b and generate the second bit of the demodulated digital signal based on the relative amplitudes of the two signals.

The split ratio of the second partial drop filter bank 103 is about ½. Since the residual incident signal has about ⅔ of the power of the original incident signal, the power coupled out by the second partial drop filter bank is about ⅓ (i.e., ⅔*½) of the power, substantially total to the portion of power coupled out by the first partial drop filter bank 102. In this manner, roughly ⅓ of the power may be delivered to each of the 3 filter banks.

The third bit of the demodulated digital signal of the incident signal is generated by a third filter bank 104 in the receiver 100. Since the incident signal in this example is an 8-ary FSK signal that may be represented by three bits (i.e., $\log_2(8)$), there is no need to further demodulate the incident signal after the third filter bank 104 and the split ratio of the third filter bank 104 may be substantially equal to 1.

The third filter bank 104 includes a third sequence of ring resonators 140a to 140h evanescently coupled to the input waveguide 110 after the second partial drop filter bank 103. Similar to the first and the second partial drop filter banks 102 and 103, the third filter bank 103 also includes two groups of ring resonators. The first group includes ring resonators 140b, 140d, 140f, and 140h having resonant wavelengths at $\lambda_2$, $\lambda_4$, $\lambda_6$, and $\lambda_8$, respectively, and the second group includes ring resonators 140a, 140c, 140e, and 140g having resonant wavelengths at $\lambda_1$, $\lambda_3$, $\lambda_5$, and $\lambda_7$, respectively. Spectral components at $\lambda_2$, $\lambda_4$, $\lambda_6$, and $\lambda_8$ are coupled out to an output waveguide 142a and detected by a detector 144a and spectral components at $\lambda_1$, $\lambda_3$, $\lambda_5$, and $\lambda_7$ are coupled to another output waveguide 142b and detected by another detector 144b. Signals acquired by the two detectors 144a and 144b are transmitted to a third comparator 146, which generates the third bit of the demodulated digital signal based on the relative amplitudes of the two signals, which in this case, compares the aggregate power in the odd wavelengths to the aggregate power in the even wavelengths.

The receiver 100 converts the incident signal into 3 (i.e., $\log_2(8)$) pairs of intermediary signals, each of which represents a sum of different spectral components, coupled out by ring resonators, in the incident signal and is detected by a respective detectors (124a/b, 134a/b, and 144a/b). Every bit of the demodulated signal may then be generated by comparing each pair of the intermediary signals. Therefore, the ring resonators (120, 130, and 140) may carry out both demultiplexing and demodulation. Compared to conventional receivers, which usually separate components for demultiplexing and demodulation, the receiver 100 may have fewer components and a lower SWAP.

Furthermore, the optical elements in the front end may have wide optical bandwidths, exceeding many THz, and, therefore, may be capable of accommodating numerous wide-band optical signals that may support ultra-high (GHz-class to 100+ GHz class) data rates with good sensitivity. The binary comparisons may be achieved using all-optical switching techniques or using more conventional optical-to-electronic (O-E) conversion using high-speed photo-detectors followed by electronic comparators or decision circuitry. Since commercially available photodetectors and comparators have bandwidths exceeding 40 GHz, a 40+ Gsymbol/s 16-FSK receiver using elements of embodiments of this invention may support 160+ Gbps data rates, with the 4-bits from each symbol separated into four 40 GHz data streams. Multi-mode optics may be used to further reduce insertion losses and increase reconfigurable functionality with fewer optical elements. For example, high-speed (greater than 10 GHz-class) photodetectors may be procured with multi-mode input fiber.

The receiver 100 shown in FIG. 1 uses an 8-ary FSK signal for illustrative purposes. In practice, the approach may be extended to a general M-ary incident signal, in which case the receiver 110 may convert the incident signal into $\log_2(M)$ pairs of intermediary signals for generating the demodulated signal. The approach may also be extended to other modulation schemes. In one example, the input signal may include an M-ary pulse-position modulation (M-PPM) signal. In another example, the input signal may include a 2-dimensional hybrid f-FSK/p-PPM format or 3-dimensional f-FSK/p PPM/L-PSK format.

The input waveguide 110 shown in FIG. 1 has a meander structure such that the partial drop filters banks 102, 103, and 104 may be arranged in a tiered configuration and allow, for example, efficient use of substrates on which the receiver 100 is fabricated. In practice, other configurations, such as a straight input waveguide 110, a ring-shaped input waveguide 110, or a rectangular input waveguide 110, may also be used to accommodate, for example, different form factors.

The ring resonators (120, 130, and 140) shown in FIG. 1 may have various diameters depending on, for example, the resonant wavelength. As understood in the art, the resonance wavelength $\lambda$ of the mth mode in a ring resonator is $\lambda = D\pi n_{eff}/m$, where D is the resonator diameter, $n_{eff}$ is the effective refractive index (RI) of the mth mode of the ring resonator, and m is an integer. The resonant wavelength of the ring resonators may be about 300 nm to about 30 μm (e.g., 300 nm, 500 nm, 750 nm, 1 μm, 5 μm, 10 μm, 15 μm, 20 μm, 25 μm, or 30 μm). The diameter D of the ring resonators may be about 2 μm to about 150 μm (e.g., 2 μm, 5 μm, 10 μm, 20 μm, 50 μm, 60 μm, 70 μm, 80 μm, 90 μm, 100 μm, 110 μm, 120 μm, 130 μm, 140 μm, or 150 μm).

The resonant wavelength of the ring resonators may also be adjusted by tuning the effective refractive index $n_{eff}$ of the ring resonators. For example, a piezo-electric element or other suitable element may be configured to apply a mechanical force to the ring resonators so as to modulate the optical path lengths of the ring resonators. The mechanical force may be applied via, for example, compression, bending, stretching, shearing, or any other means known in the art. In another example, an electric field may be applied to the ring resonators to modulate the refractive index via, for example, two electrodes, with one electrode attached to the top of the ring resonators and the other electrode attached to the bottom. Alternatively or additionally, the electrodes may be attached to a perimeter of the ring resonators. In yet another example, the temperature of the ring resonators may be varied to modulate the refractive index. For example, a semiconductor heater may be fabricated in thermal communication with (e.g., beside or underneath) the ring resonators. In yet another example, an acoustic field may be applied to the ring resonators to modulate the refractive index. In one example, each ring resonator may be tuned independently to, for example, address slight change of carrier wavelength. In another example, the tuning of resonant wavelength may be applied to groups of ring resonators or all ring resonators to demodulate, for example, signals with a different modulation scheme.

The ring resonators (120, 130, or 140), the input waveguide 110, and the output waveguides may be fabricated using existing semiconductor fabrication techniques. Various materials may be used to form the ring resonators and the waveguides, such as silicon, germanium, silicon oxide, silicon nitride, and chalcogenide glass.

The detectors (124a/b, 134a/b, and 144a/b) may include one or more broadband sensing elements and/or spectrally selective narrowband sensing elements. In on example, the detectors may include PIN diodes and/or avalanche photo diodes (APDs). In another example, the detectors may include sensors that are sensitive to particular wavelengths. For example, the detector 124a may have high sensitivity at wavelengths $\lambda_1$, $\lambda_2$, $\lambda_3$, and $\lambda_4$, but not other wavelengths, so as to increase the signal-to-noise ratio of the detected signals. Wavelength selectivity may be achieved by, for example, gratings or other dispersive elements.

The comparators (126, 136, and 146) may include either analog comparators or digital comparators. In one example, the detectors (124a/b, 134a/b, and 144a/b) may generate digital signals from the optical signal coupled out by the ring resonators and the comparators may be digital accordingly. In another example, the detectors may generate analog signals from the optical signal and therefore the comparator may be analog (e.g., an op-amp comparator) as well.

Partial Drop Filters

The partial drop filter banks 102 and 103 include partial drop filters formed by ring resonators sandwiched between two waveguides, one input waveguide and one output waveguide. Conventionally, optical ring-based filters utilize a symmetric configuration, in which the ring resonator is the same optical distance from the input waveguide and the output waveguide. This configuration may result in full power dropping at resonance with Lorentzian filter responses for a first-order filter. In contrast, by adjusting the ring-to-waveguide separations and/or refractive index profiles to be asymmetric, partial power dropping may be achieved while maintaining the Lorentzian filter response around the resonant wavelength.

Figures 2A, 2B:
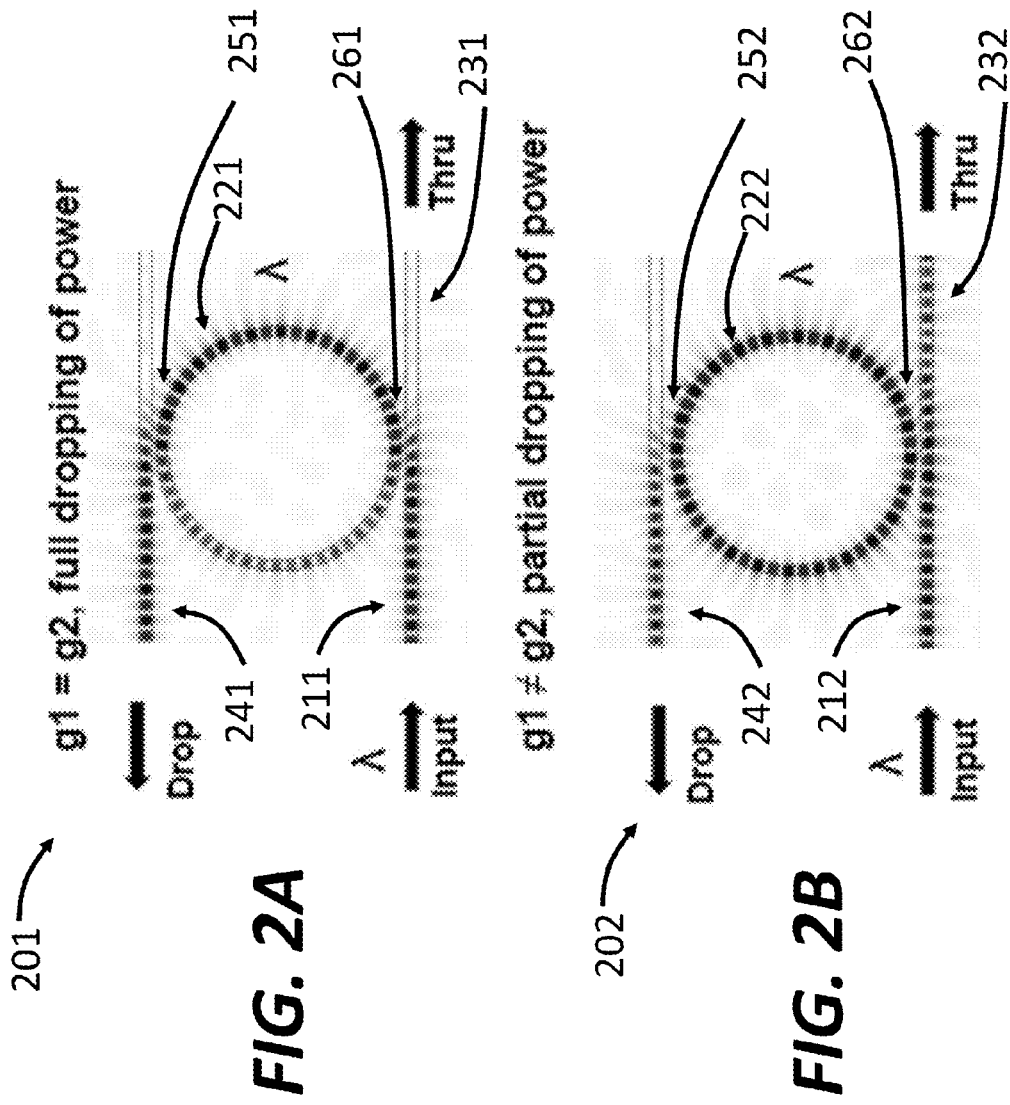
FIGS. 2A-2B shows schematics of a full drop filter and a partial drop filter, respectively, that may be used in the optical receiver shown in FIG. 1.

FIG. 2A shows the schematic of a full drop filter 201 including a ring resonator 221 disposed between an input waveguide 211 (also referred to as the input port) and an output waveguide 241 (also referred to as the drop port). The filter 201 also includes a thru port 231 that may be part of the input waveguide 211. There is a first gap 251 from the output waveguide 241 to the ring resonator 211 and a second gap 261 from the input waveguide 211 to the ring resonator 211. The first gap 251 and the second gap 261 have the same width such that the ring resonator 221 couples the entire incident light from the input waveguide 211 to the output waveguide 241 when the wavelength of the incident light matches the resonant wavelength of the ring resonator 221. In this case, the thru port 231 has substantially no output.

FIG. 2B shows a schematic of a partial drop filter 202 including a ring resonator 222, which is separated from an output waveguide 242 by a first gap 252 and from an input waveguide 212 by a second gap 262. Incident light that is transmitted through the input waveguide 212 may be delivered through an output thru port 232. The optical widths of the first gap 252 and the second gap 262 are different. In this case, when the wavelength incident light matches the resonant wavelength of the ring resonator 222, some of the incident light is coupled to the output waveguide 242 and some of the incident light is transmitted through the thru port 232. In other words, the ring resonator 222 couples only a portion (less than 100%) of the incident light to the output waveguide 242, thereby allowing subsequent use (e.g., demodulation) of the transmitted light delivered by the through port 232.

Figure 3:
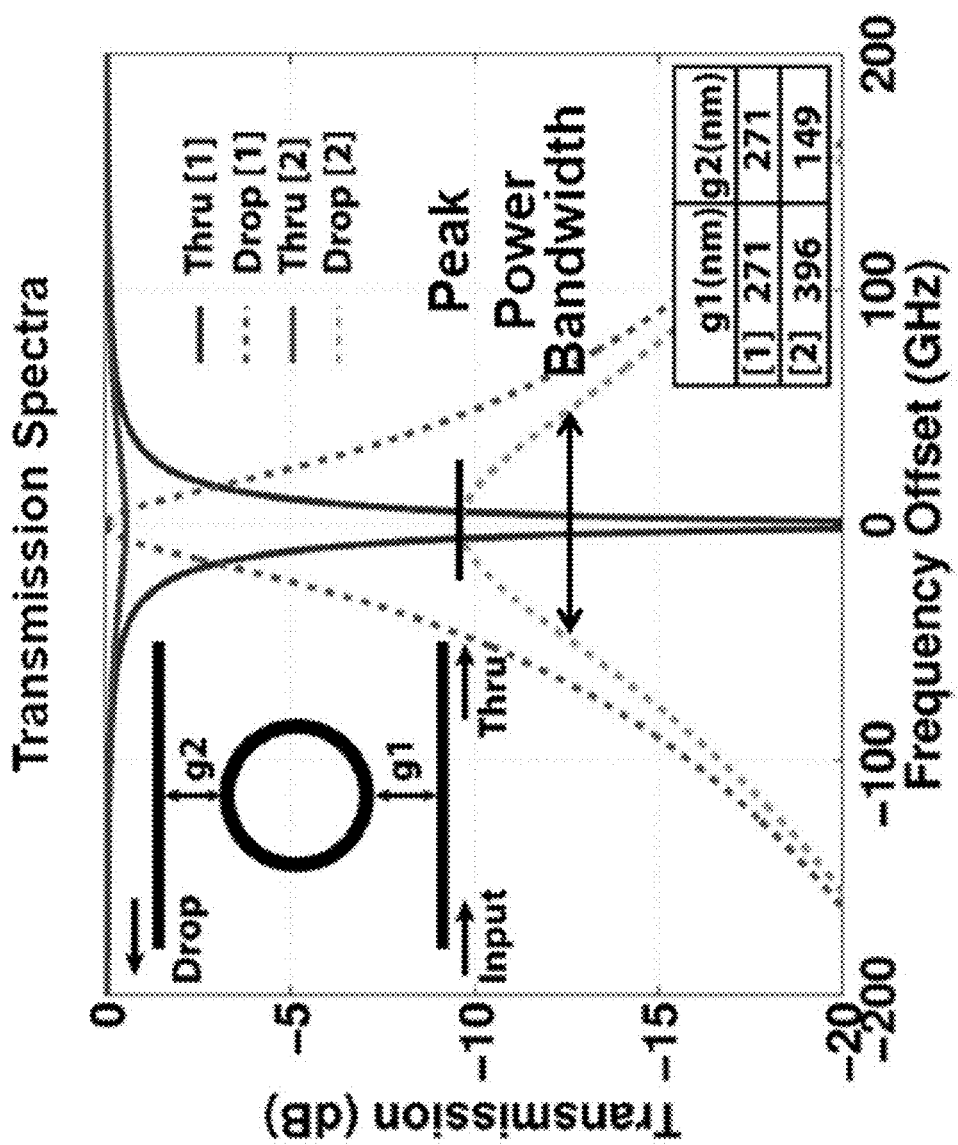
FIG. 3 shows spectra of light at drop ports and thru ports of full drop filters and partial drop filters.

FIG. 3 shows spectra of light at the drop ports (i.e., output waveguide) and the thru ports of full drop filters and partial drop filters. The full drop filter used in FIG. 3 has a width of 271 nm for the two gaps $g_1$ and $g_2$ separating the ring resonator from the input waveguide and output waveguides, respectively. The spectrum of light at the thru port of the full drop filter has a sharp valley at the resonant wavelength and the spectrum of light at the drop port has a sharp peak, showing that light at the resonant wavelength of the ring resonator is mostly coupled to the drop port. In contrast, the partial drop filter has a first width $g_1$ of 396 nm separating the ring resonator from the input waveguide and a second width of 149 nm separating the ring resonator from the output waveguide. The valley and peak in the corresponding spectra of the partial drop filter are much less sharper compared to the spectra of the full drop filter, demonstrating that the partial drop filter may simultaneously transmit incident light to both drop port and thru port.

Figures 4A, 4B:
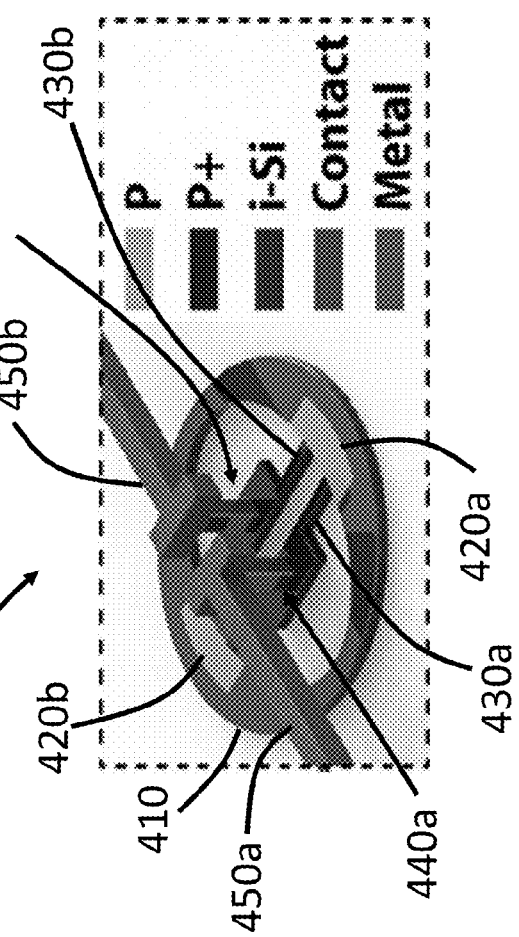
FIG. 4A shows a schematic of a ring resonator including integrated heaters that may be used for partial drop filters.
FIG. 4B is a scanning electron micrograph (SEM) of a ring-based partial drop filter using a ring resonator shown in FIG. 4A.

FIG. 4A show a schematic of a ring resonator 400 including integrated heaters that may be used for partial drop filters. The ring resonator 400 includes a micro-ring 410 that may be made of intrinsic silicon. The micro-ring 410 includes two heaters 420a and 420b, which may be fabricated by doping the micron-ring 410 with p type dopants. The two heaters 420a and 420b are connected to two contacts 440a and 440b via two tethers 430a and 430b. The tethers 430a and 430b may be fabricated by p+ doping in the substrate (not labeled). Two metal electrodes 450a and 450b are coupled to the two contracts 440a and 440b, respectively, to apply a voltage on the heaters 420a and 420b so as to change the temperature of the heaters 420a and 420b.

FIG. 4B shows a scanning electron micrograph (SEM) of a partial drop filter using the ring resonator 400 shown in FIG. 4A. The device is fabricated on a 300 mm silicon on insulator (SOI) wafer with a 220 nm silicon layer using 193 nm optical immersion lithography. Integrated heaters are introduced by p-type doping at a concentration of $1 \times 10^{18}$ cm$^{-3}$ in the adiabatic ring waveguide, and contacts are connected to the heaters by small tethers of silicon with p+ doping at a concentration of $1 \times 10^{20}$ cm$^{-3}$. Each ring in this system may be thermally tunable in an independent manner. The fabricated adiabatic ring has a diameter of about 6 μm in diameter, thereby creating a large free spectral range (FSR) for WDM applications. More information on ring-based partial drop filters may be found in Zhan Su, et al., "Silicon wavelength-selective partial-drop broadcast filter bank", Optics Letters, Vol. 39, No. 18, 5459 (2014), which is hereby incorporated herein in its entirety.

Optical Receivers for Different Orders of FSK Signals

As described above, the receiver 100 shown in FIG. 1 may be extended to demodulate signals other than 8-ary FSK signals. FIG. 5 is a table summarizing several demodulation options along with corresponding implementation features and performance estimates. The parameter f in each configuration is the number of orthogonal frequencies in the modulation scheme and the parameter w represents the number of independent wavelength bands. The list of options shown in FIG. 5 is for illustrative purposes only and is not exhaustive. Among those option listed in FIG. 5, 16 FSK provide a good balance in practice taking into account performance, complexity, and implementation losses. In this option, the 16 FSK signal conveys four bits of digital information. To this end, a receiver with 64 selecting filtering elements may couple out different combinations of spectral components that are detected by 8 demodulation detectors. The acquired signals (also referred to as intermediary signals) include four pairs. Each pair is compared by a comparator to generate one bit of digital information for the incident signal, with a sensitivity of about 10.4 photons per bit (dB PPB) at a bit error rate of about $10^{-9}$. To provide additional context on the benefits, this sensitivity is about 4 times better than on off keying (the M=1 case) or 2-FSK (binary FSK, the M=2 case). Moreover, the electrical bandwidth needed to generate and receive the 16-FSK data is only ¼ the data rate.

Figure 6:
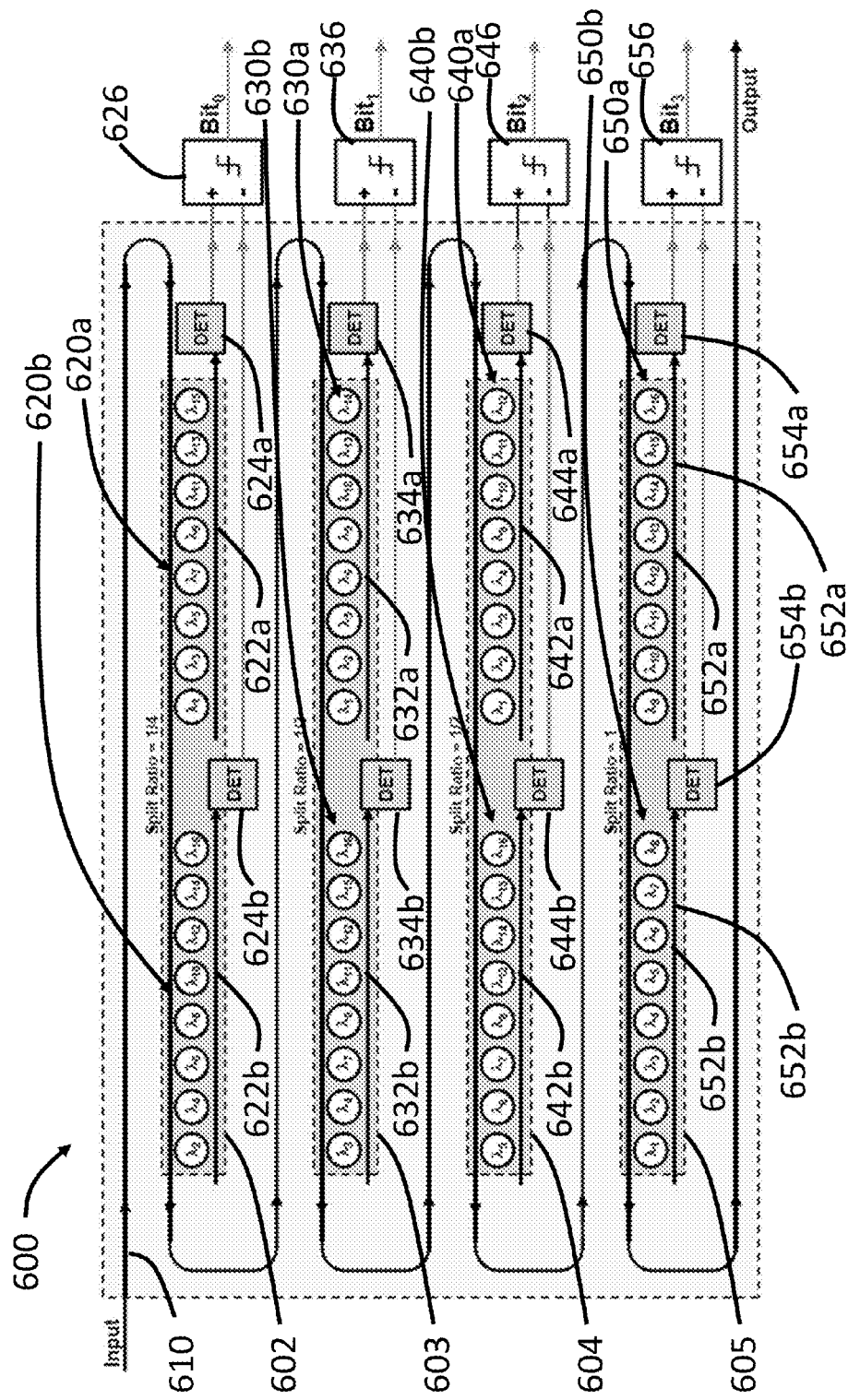
FIG. 6 shows a schematic of an optical receiver for demultiplexing and demodulating a 16-ary frequency shift keyed (FSK) modulated signal.

FIG. 6 shows a schematic of an optical receiver 600 that may demodulate 16 FSK signals. The receiver 600 includes an input waveguide 610 to receive the input signal, which may include spectral components at 16 different carrier wavelengths $\lambda_1, \lambda_2, \ldots,$ and $\lambda_{16}$. The input waveguide 610 has a meander structure to allow the tiered arrangement of multiple partial drop filter banks arrayed in series with each other along the input waveguide 610. A first partial drop filter bank 602 includes 16 ring resonators, each of which has a distinct resonant wavelength selected from the 16 carrier wavelengths. The ring resonators in the first partial drop filter bank 602 are divided into two groups. The first group of ring resonators 620a includes eight ring resonators having resonant wavelengths of $\lambda_1, \lambda_3, \lambda_5, \lambda_7, \lambda_9, \lambda_{11}, \lambda_{13},$ and $\lambda_{15}$, respectively (the odd wavelengths), and the second group of ring resonators 620b includes eight ring resonators having resonant wavelengths of $\lambda_2, \lambda_4, \lambda_6, \lambda_8, \lambda_{10}, \lambda_{12}, \lambda_{14},$ and $\lambda_{16}$, respectively (the even wavelengths). The first group of ring resonators 620a is evanescently coupled to an output waveguide 622a that transmits spectral components to a detector 624a. The second group of ring resonators 620b is evanescently coupled to another output waveguide 622b that transmits spectral components to another detector 624b. A comparator 626 receives signals acquired by the two detectors 624a and 624b and generates the first bit of digital information for the demodulated digital signal, which is determined by comparison of the aggregate even signal power and aggregate odd signal power.

The split ratio of the first partial drop filter bank 602 may be substantially equal to ¼ (i.e., 25%) and the input signal not coupled out by the first partial drop filter bank 602 continues to propagate in the input waveguide 610 for subsequent generation of other bits of digital information for the demodulated digital signal.

A second partial drop filter bank 603 is formed in series with the first partial drop to couple out different spectral components in the input signal to generate the second bit of digital information. The second partial drop filter bank 603 also includes 16 ring resonators categorized into two groups 630a and 630b, but resonant wavelengths of the ring resonators in each group are different than the resonant wavelengths in groups 620a and 620b of the first partial drop filter bank 602. More specifically, the first group 630a includes 8 ring resonators resonating at wavelengths of $\lambda_1, \lambda_2, \lambda_5, \lambda_6, \lambda_9, \lambda_{10}, \lambda_{13},$ and $\lambda_{14}$, respectively, and the second group 630b includes 8 ring resonators resonating at wavelengths of $\lambda_3, \lambda_4, \lambda_7, \lambda_8, \lambda_{11}, \lambda_{12}, \lambda_{15},$ and $\lambda_{16}$, respectively. A first output waveguide 632a is evanescently coupled to the first group of ring resonators 630a to transmit spectral components at $\lambda_1, \lambda_2, \lambda_5, \lambda_6, \lambda_9, \lambda_{10}, \lambda_{13},$ and $\lambda_{14}$ to a first detector 634a and a second output waveguide 632b is evanescently coupled to the second group of ring resonators 630b to transmit spectral components at $\lambda_3, \lambda_4, \lambda_7, \lambda_8, \lambda_{11}, \lambda_{12}, \lambda_{15},$ and $\lambda_{16}$ to a second detector 634b. Signals generated by the two detectors 634a and 634b are compared by a comparator 636 to generate the second bit of digital information. The second partial drop filter bank 603 has a split ratio substantially equal to ⅓ so as to couple out about ¼ (i.e., ⅓*¾) of the total power in the original input signal.

The receiver 600 also includes a third partial drop filter bank 604 to generate the third bit of digital information and a fourth partial drop filter bank 605 to generate the fourth bit of digital information. The third partial drop filter bank 604 has a split ratio substantially equal to ½ (i.e., about 50%) and the fourth partial drop filter bank 605 has a split ratio substantially equal to 1 (i.e., about 100%). Although the fourth partial drop filter bank 605 has a 100% split ratio, the term "partial drop" is still used here because it couples out less than 100% (e.g., about 25%) of the entire power in the original input signal.

The third partial drop filter bank 604 has 16 ring resonators divided into two groups. The first group 640a includes 8 ring resonators resonating at wavelengths of $\lambda_1, \lambda_2, \lambda_3, \lambda_4, \lambda_9, \lambda_{10}, \lambda_{11},$ and $\lambda_{12}$, respectively, and the second group 640b includes 8 ring resonators resonating at wavelengths of $\lambda_5, \lambda_6, \lambda_7, \lambda_8, \lambda_{13}, \lambda_{14}, \lambda_{15},$ and $\lambda_{16}$, respectively. Two output waveguides 642a and 642b are coupled to the first group 640a and second group 640b of ring resonators, respectively, to transmit spectral components coupled out by the respective groups of ring resonators to respective detectors 644a and 644b. A comparator 646 compares the signals from the two detectors 644a and 644b to generate the third bit of digital information.

The fourth partial drop filter bank 605 also includes 16 ring resonators divided into two groups, but the first group 650a includes 8 ring resonators resonating at wavelengths of $\lambda_9, \lambda_{10}, \lambda_{11}, \lambda_{12}, \lambda_{13}, \lambda_{14}, \lambda_{15},$ and $\lambda_{16}$, respectively, and the second group 650b includes 8 ring resonators resonating at wavelengths of $\lambda_1, \lambda_2, \lambda_3, \lambda_4, \lambda_5, \lambda_6, \lambda_7,$ and $\lambda_8$, respectively. Spectral components coupled out by the first group of ring resonators 650a are transmitted to a first detector 654a via a first output waveguide 652a and spectral components coupled out by the second group of ring resonators 650b are transmitted to a first detector 654b via a first output waveguide 652b. Signals generated by the two detectors 654a and 654b are compared at a comparator 656 to generate the fourth bit of digital information.

Reconfigurable Optical Receivers Including Noise Rejection Filters

The optical receivers shown in FIG. 1 and FIG. 6 are reconfigurable because the passband wavelengths of the filtering elements may be independently adjusted by, for example, thermal heating (see, e.g., FIG. 4A). The reconfigurability of the optical receivers described herein may be further improved by being able to align unused or unneeded filtering elements to null wavelengths ($\lambda_\phi$), which are wavelengths where there is no input optical signal power. These filtering elements may also be tuned to align with carrier wavelengths such that they may be used for demodulation when desired, thereby improving the reconfigurability of the resulting optical receivers. Noise rejection filters may be used before the partial drop filter banks (i.e., before any demodulation) to remove any optical noise (e.g., amplified spontaneous emission or ASE noise from an optical amplifier or unwanted out-of-band signal power). The absence of optical power at $\lambda_\phi$ (facilitated by the use of noise rejection filters) allows unused filters to be parked at $\lambda_\phi$ without degrading performance, since there is no optical power at $\lambda_\phi$ to direct to the demodulator detectors.

Figure 7:
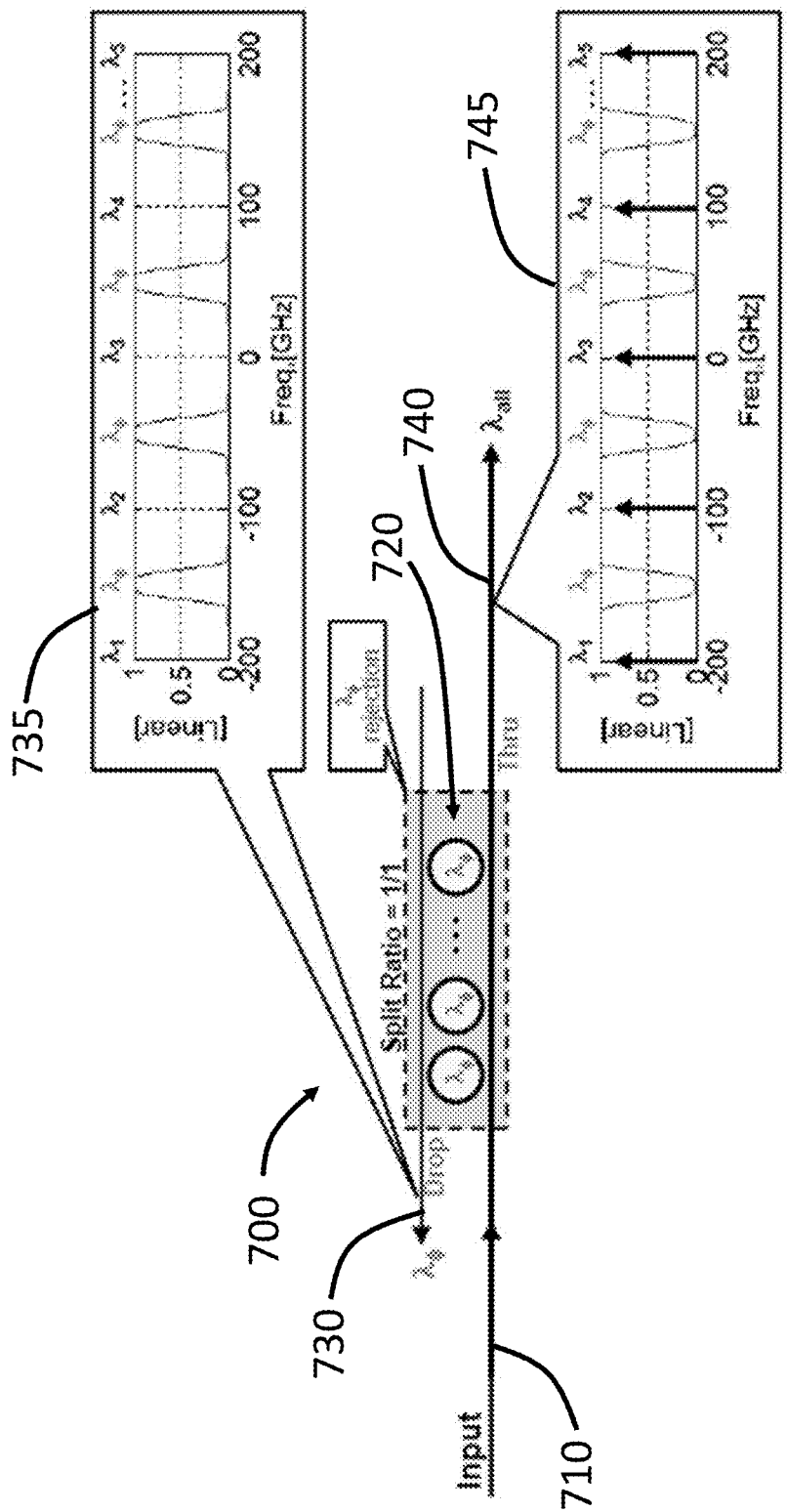
FIG. 7 shows a schematic of ring-based noise rejection filters that may be used in the optical receivers shown in FIG. 1 and FIG. 6.

FIG. 7 shows a schematic of an array of noise rejection filters that may be used in the optical receivers described herein. The filters 700 include an input waveguide 710 that receives an input signal for demodulation. Filtering elements such as an array of ring resonators 720 are evanescently coupled to the input waveguide 710. The ring resonators 720 have a resonant wavelength $\lambda_\phi$ that is not any of the carrier wavelengths in the input signal and therefore may couple out unwanted noise or out-of-band signal spectral components at $\lambda_\phi$ to an output waveguide 730 (also referred to as a drop port) and transmit spectral components at all other wavelengths ($\lambda_{all}$) through a thru port 740 for demodulation. Multiple ring resonator filters may be used to broaden the $\lambda_\phi$ reject band and deepen noise rejection. Other filtering elements may also be used, such as high-order ring resonator filters, unbalanced MZIs, and various combinations. Periodic filtering elements may also be used, so that a single rejection filter may provide many periodic $\lambda_\phi$ wavelength bands.

FIG. 7 also shows the drop spectrum 735 observed at the drop port 730 and the thru spectrum observed at the thru port 740. The drop spectrum 735 shows that light coupled out from the input waveguide 710 are all at $\lambda_\phi$, which may be a periodic set of wavelength bands referred to as the null wavelength band ($\lambda_\phi$). Different ring resonators in the array of ring resonators 720 may have different resonant wavelengths so as to more effectively reduce noise over a broader bandwidth. In addition, the null wavelengths $\lambda_\phi$ may be between two carrier wavelengths $\lambda_i$ and $\lambda_j$ such that the unused or unneeded optical filters may be more easily tuned to a nearby $\lambda_\phi$. The thru spectrum, in contrast, shows that transmitted light includes all spectral components other than those at $\lambda_\phi$. Therefore, the ring resonators 720 may effectively reduce noise in the input signal and therefore improve the performance of the subsequent demodulation.

Figure 8:
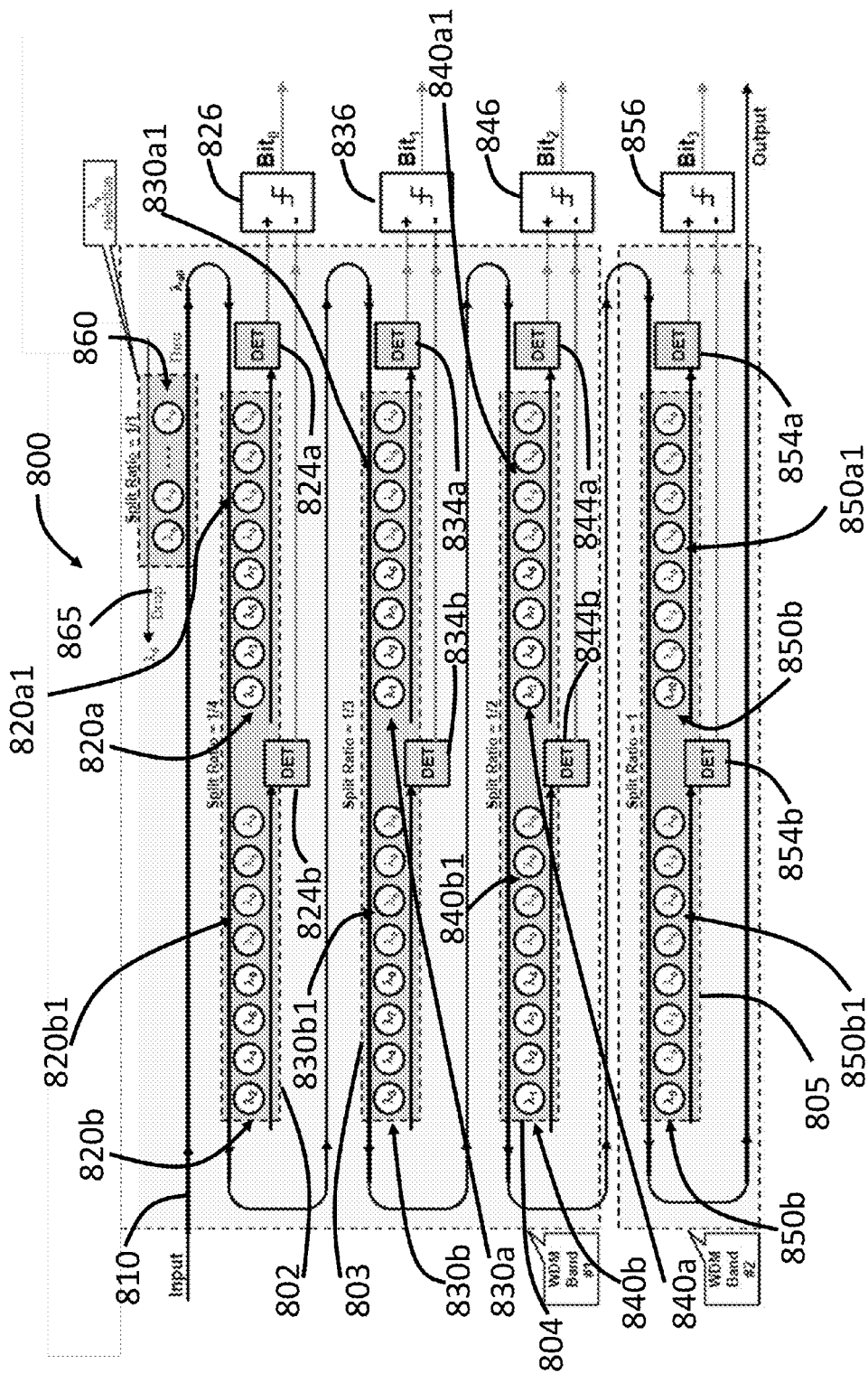
FIG. 8 shows a schematic of an optical receiver including 64 ring resonator-based filtering elements configured to demultiplex and demodulate 8-ary FSK modulated signals and 2-ary FSK modulated signals composed of frequencies (wavelengths) in two wavelength-division-multiplexed (WDM) bands.

FIG. 8 shows a schematic of an optical receiver 800 that may include noise rejection filters 860 before partial drop filter banks. Note that alternatively, noise rejection filtering may also be performed prior to the optical receiver 800. The filters within the partial drop filter banks are configured to demodulate input signals in two WDM bands, one with modulation on 8 orthogonal frequencies (wavelengths) and one with modulation on 2 orthogonal frequencies. The receiver 800 includes an input waveguide 810 to receive the input signal for demodulation. An array of null wavelength ring resonators 860 are evanescently coupled to the input waveguide 810 to couple out spectral components at $\lambda_\phi$ to a drop port 865 and to transmit the other spectral components through the input waveguide 810 for demodulation. Although the term "noise rejection" is used here for the filters 860, it is understood that the filters 860 may couple out not only noise, but also other lights having wavelengths that match the null wavelengths $\lambda_\phi$.

The optical receiver 800 demodulates the input signal via four partial drop filter banks 802, 803, 804, and 805. The first partial drop filter bank 802 includes 16 ring resonators in two groups. The first group 820a includes 8 ring resonators, four of which resonate at $\lambda_1$, $\lambda_3$, $\lambda_5$, $\lambda_7$ while the other four resonators 820a1 resonate at null wavelengths $\lambda_\phi$. The second group 820b also includes 8 ring resonators, but four of them resonate at $\lambda_2$, $\lambda_4$, $\lambda_6$, $\lambda_8$ while the other four resonators 820b1 resonate at null wavelengths $\lambda_\phi$. In FIG. 8, the partial drop filters resonating at carrier wavelengths are grouped together and the noise rejection filters are grouped together. In practice, the partial drop filters and the noise rejection filters may also be arranged in an alternating manner, in which case each partial drop filter for demodulation is next to at least one noise rejection filter. Two detectors 824a and 824b detect the spectral components coupled out by the first group 820a and second group 820b of ring resonators, respectively, and a comparator 826 compares the two signals from the two detectors 824a and 824b to generate a first bit of digital information for the demodulated signal.

The second partial drop filter bank 803, similar to the first partial drop filter bank 802, also includes 16 ring resonators in two groups. The first group 830a includes 8 ring resonators, four of which resonant at $\lambda_1$, $\lambda_2$, $\lambda_5$, $\lambda_6$ while the other four resonators 830a1 resonate at null wavelengths $\lambda_\phi$. The second group 830b also includes 8 ring resonators, but four of them resonate at $\lambda_3$, $\lambda_4$, $\lambda_7$, $\lambda_5$ while the other four resonators 830b1 resonate at null wavelengths $\lambda_\phi$. Two detectors 834a and 834b convert the optical components, coupled out by the first group 830a and second group 830b of ring resonators, respectively, into two electrical signals. A comparator 836 compares the two signals from the two detectors 834a and 834b to generate a second bit of digital information for the demodulated signal.

The 16 ring resonators in the third partial drop filter bank 804 are similarly divided into two groups. The first group 840a includes 8 ring resonators, four of which resonant at $\lambda_5$, $\lambda_6$, $\lambda_7$, $\lambda_8$ while the other four resonators 840a1 resonate at null wavelengths $\lambda_\phi$. The second group 840b also includes 8 ring resonators, but four of them resonate at $\lambda_1$, $\lambda_2$, $\lambda_3$, $\lambda_4$ while the other four resonators 840b1 resonate at null wavelengths $\lambda_\phi$. Optical components, coupled out by the first group 840a and second group 840b of ring resonators, respectively, are detected by two detectors 844a and 844b. A comparator 846 compares the two signals from the two detectors 844a and 844b to generate a third bit of digital information for the demodulated signal.

The first three partial drop filter banks 802, 803, and 804 in the receiver 800 demodulate spectral components at wavelengths $\lambda_1$ to $\lambda_8$, which are collectively referred to as the first wavelength-division-multiplexing (WDM) band. The fourth partial drop filter bank 805, in contrast, demodulates spectral components at wavelengths of $\lambda_9$ to $\lambda_{10}$, which are collectively referred to as the second WDM band. The fourth partial drop filter bank 805 includes 16 ring resonators in two groups. The first group 850a includes one resonator resonating at $\lambda_{10}$ and seven resonators 850a1 resonating at null wavelengths $\lambda_\phi$. The second group 850b includes one resonator resonating at $\lambda_9$ and seven resonators 850b1 resonating at null wavelengths $\lambda_\phi$. Two detectors 854a and 854b detect the spectral components coupled out by the first group 850a and second group 850b of ring resonators, respectively, and a comparator 856 compares the two signals from the two detectors 854a and 854b to generate a fourth bit of digital information for the demodulated signal.

Figure 9:
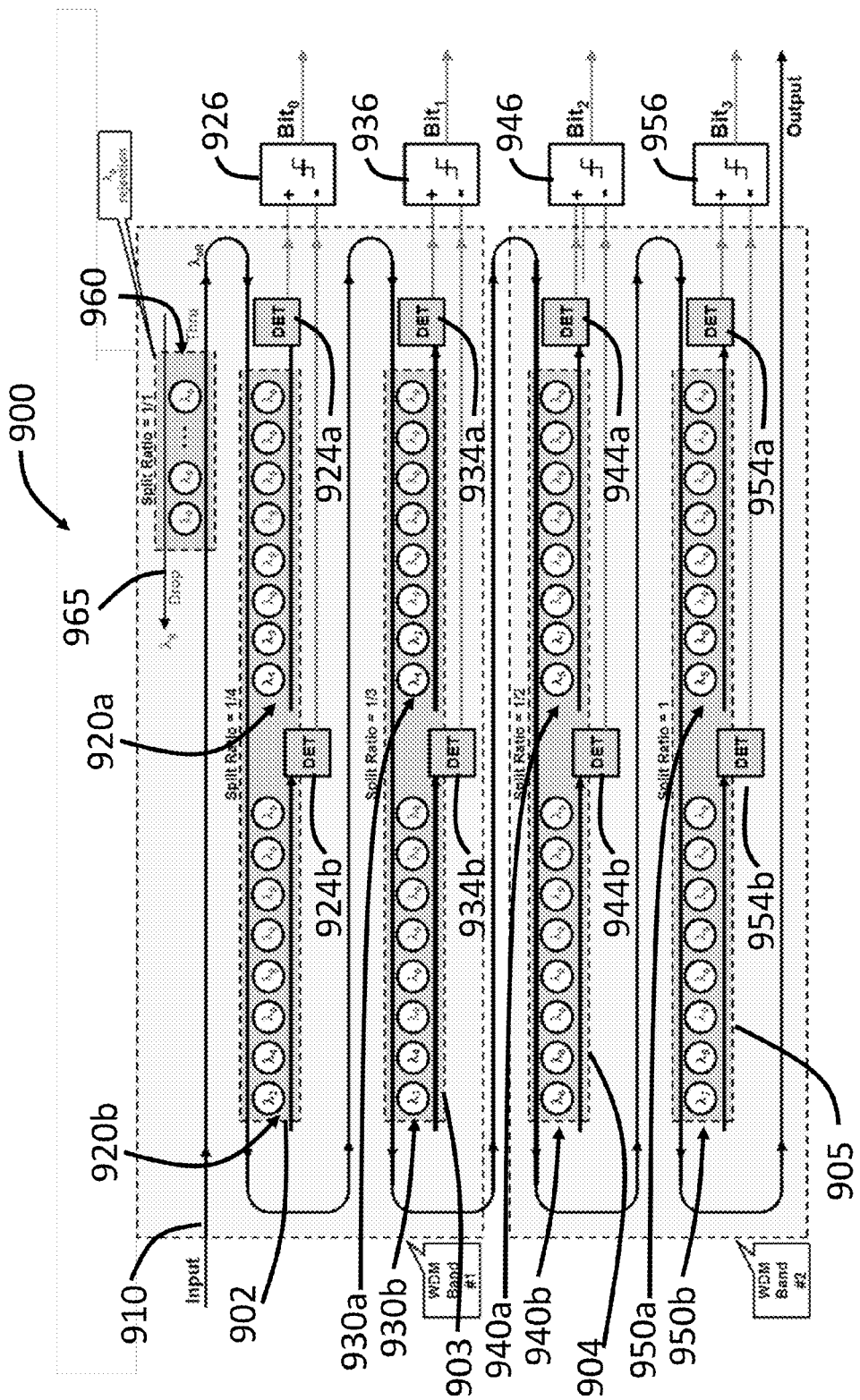
FIG. 9 shows a schematic of an optical receiver including 64 ring resonator based filtering elements configured to demultiplex and demodulate signals two groups of 4-ary FSK modulated orthogonal frequencies in two WDM bands.
Figure 10:
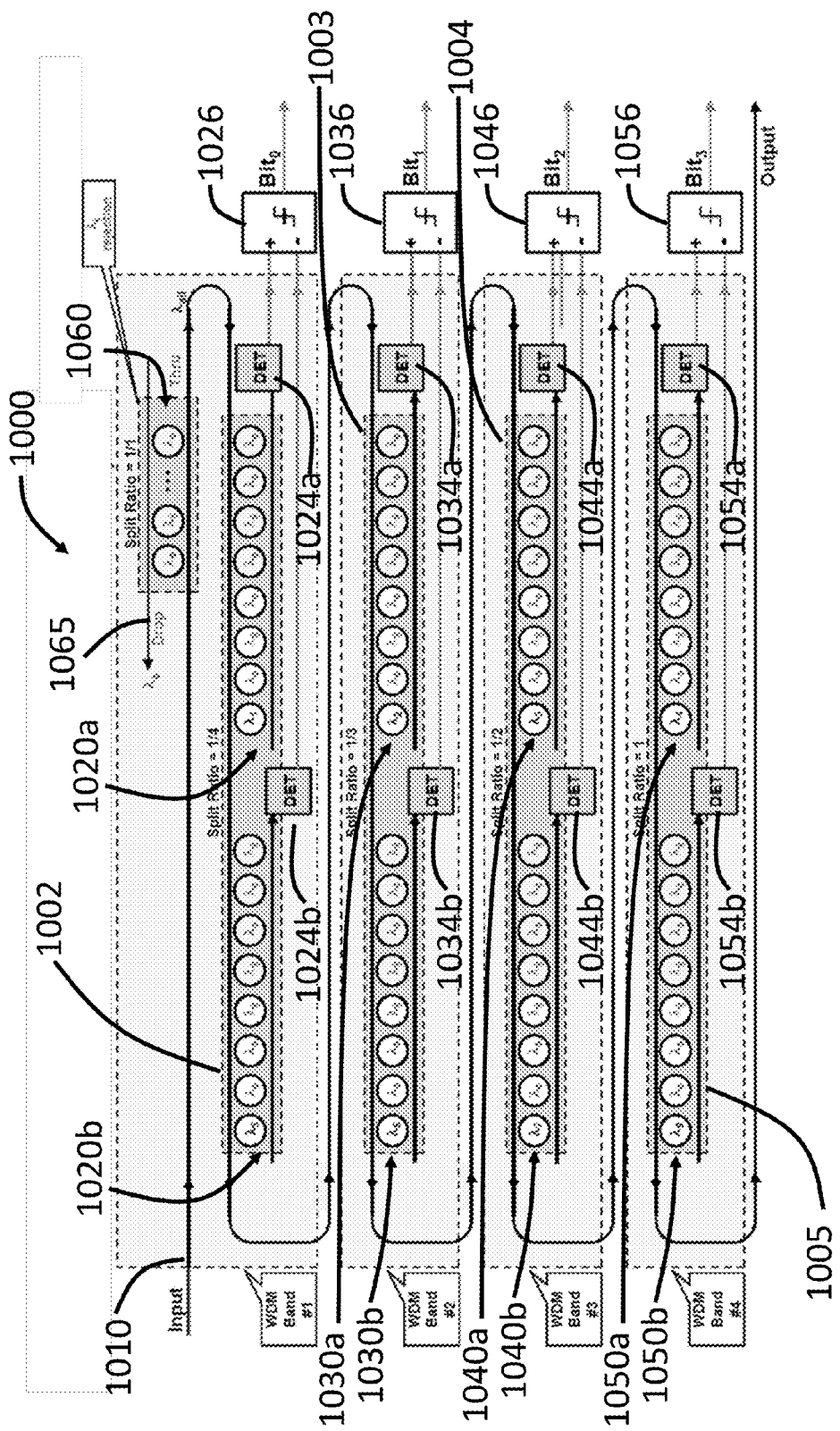
FIG. 10 shows a schematic of an optical receiver including 64 ring resonator based filtering elements configured to demultiplex and demodulate four pairs of 2-ary modulated FSK signals composed of 8 orthogonal frequencies (wavelengths) in four WDM bands.
Figure 11:
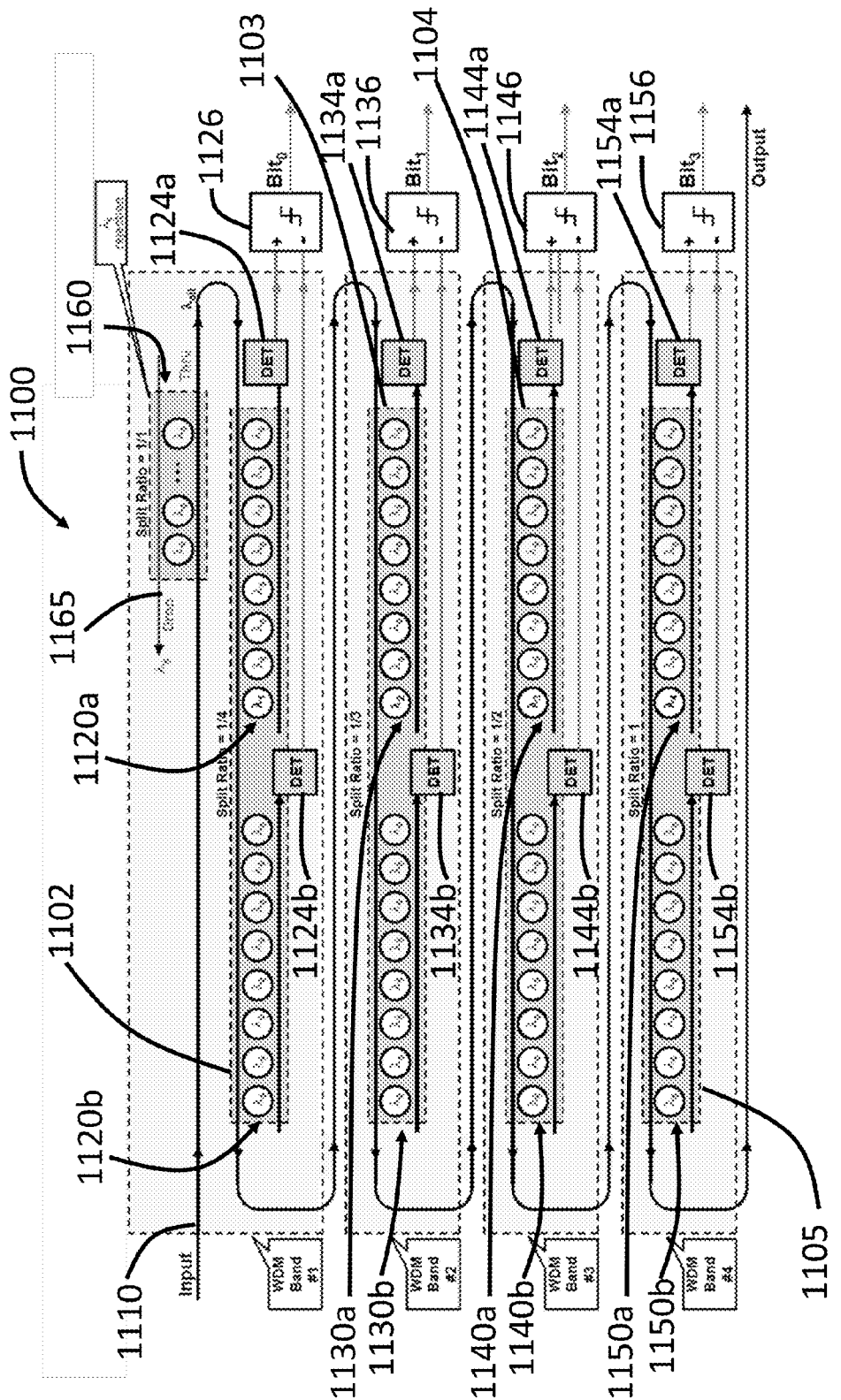
FIG. 11 shows a schematic of an optical receiver including 64 ring resonator based filtering elements configured to demodulate on off key (OOK) modulated signals in four WDM bands.

The optical receiver 800 shown in FIG. 8 includes the same number of ring resonators (i.e., 64 ring resonators) as the optical receiver 600 shown in FIG. 6. But by tuning the resonant wavelengths of some of the ring resonators, the optical receiver 800 may be reconfigured to demodulate different input signals. The optical receiver 800 is just one of the various receivers that may be reconfigured into from the optical receiver 600. FIGS. 9-11 show some other receivers that may be reconfigured from the receiver 600 shown in FIG. 6.

FIG. 9 shows a schematic of an optical receiver 900 to demodulate input signals including 8 orthogonal frequencies in two different WDM bands. The receiver 900 includes an input waveguide 910 to receive input signals. A group of ring resonators 960 resonating at null wavelengths $\lambda_\phi$ is coupled to the input waveguide 910 to perform noise rejection before demodulation. The rejected noise is coupled out via a drop port 965. Four partial drop filter banks 902, 903, 904, and 905 are coupled in series to the input waveguide 901 to demodulate the input signal after the initial noise rejection by the null wavelength resonators 960.

The carrier wavelengths of the input signals include $\lambda_1$, $\lambda_2$, $\lambda_3$, $\lambda_4$, $\lambda_5$, $\lambda_6$, $\lambda_7$, and $\lambda_8$, out of which the four wavelengths $\lambda_1$, $\lambda_2$, $\lambda_3$, and $\lambda_4$ are in the first WDM band and the other four wavelengths $\lambda_5$, $\lambda_6$, $\lambda_7$, and $\lambda_8$ are in the second WDM band. The first two partial drop filter banks 902 and 903 demodulate the first WDM band and the partial drop filter banks 904 and 905 demodulate the second WDM band.

The first partial drop filter bank 902 includes a first group of ring resonators 920a and a second group of ring resonators 920b. The first group 920a further includes two ring resonators resonating at carrier wavelengths $\lambda_1$ and $\lambda_3$ and six ring resonators resonating at the null wavelengths $\lambda_\phi$. The second group 920b further includes two ring resonators resonating at carrier wavelengths $\lambda_2$ and $\lambda_4$ and six ring resonators resonating at the null wavelengths $\lambda_\phi$.

The second partial drop filter bank 903 includes a first group of ring resonators 930a and a second group of ring resonators 930b. The first group 930a further includes two ring resonators resonating at carrier wavelengths $\lambda_1$ and $\lambda_2$ and six ring resonators resonating at the null wavelengths $\lambda_\phi$. The second group 930b further includes two ring resonators resonating at carrier wavelengths $\lambda_3$ and $\lambda_4$ and six ring resonators resonating at the null wavelengths $\lambda_\phi$.

The third partial drop filter bank 904 includes a first group of ring resonators 940a and a second group of ring resonators 940b. The first group 940a further includes two ring resonators resonating at carrier wavelengths $\lambda_5$ and $\lambda_7$ and six ring resonators resonating at the null wavelengths $\lambda_\phi$. The second group 940b further includes two ring resonators resonating at carrier wavelengths $\lambda_6$ and $\lambda_8$ and six ring resonators resonating at the null wavelengths $\lambda_\phi$.

The fourth partial drop filter bank 905 includes a first group of ring resonators 950a and a second group of ring resonators 950b. The first group 950a further includes two ring resonators resonating at carrier wavelengths $\lambda_5$ and $\lambda_6$ and six ring resonators resonating at the null wavelengths $\lambda_\phi$. The second group 950b further includes two ring resonators resonating at carrier wavelengths $\lambda_7$ and $\lambda_8$ and six ring resonators resonating at the null wavelengths $\lambda_\phi$.

For each partial drop filter bank 902 to 905, two detectors (924a/b, 934a/b, 944a/b, and 954a/b) detect the optical signals coupled out by the respective group of ring resonators (920a/b, 930a/b, 940a/b, and 950a/b) and generate a pair of respective electrical signals. A corresponding comparator (926, 936, 946, and 956) then compares each pair of electrical signals generated by the respective pair of detectors (924a/b, 934a/b, 944a/b, and 954a/b) so as to generate a respective bit of digital information.

FIG. 10 shows the schematic of an optical receiver 1000 to demodulate 8 orthogonal frequencies in four different WDM bands. More specifically, wavelengths $\lambda_1$ and $\lambda_5$ are in the first WDM band, wavelengths $\lambda_2$ and $\lambda_6$ are in the second WDM band, wavelengths $\lambda_3$ and $\lambda_7$ are in the third WDM band, and wavelengths $\lambda_4$ and $\lambda_8$ are in the fourth WDM band. The optical receiver 1000 shown in FIG. 10 includes an input waveguide 1010 to receive input signals and an array of ring resonators 1060 resonating at null wavelengths $\lambda_\phi$ to reject noise from the input signals into a drop port 1065. The filtered input signals continue to propagate in the input waveguide 1010 for subsequent demodulation.

Four partial drop filter banks 1002, 1003, 1004, and 1005 are used to demodulate the input signals. The first partial drop filter bank 1002 includes one ring resonator resonating at $\lambda_1$ and seven resonators resonating at null wavelengths $\lambda_\phi$ in the first group 1020a of ring resonators and includes one ring resonator resonating at $\lambda_5$ and seven resonators resonating at null wavelengths $\lambda_\phi$ in the second group 1020b of ring resonators. Each group of ring resonators 1020a and 1020b is coupled to a corresponding detector 1024a and 1024b, each of which generates electrical signals for a comparator 1026 to generate one bit of digital information.

In the second partial drop filter bank 1003, one ring resonator resonating at $\lambda_2$ and seven resonators resonating at null wavelengths $\lambda_\phi$ form a first group 1030a, and one ring resonator resonating at $\lambda_6$ and seven resonators resonating at null wavelengths $\lambda_\phi$ form a first group 1030a. Two detectors 1034a and 1034b detect the spectral components coupled out by the first group 1030a and second group 1030b, respectively. A comparator 1036 then generates one bit of digital information based on the relative amplitude of the two signals acquired by the two detectors 1034a and 1034b.

The third partial drop filter bank 1004 includes one ring resonator resonating at $\lambda_3$ and seven resonators resonating at null wavelengths $\lambda_\phi$ in the first group 1040a of ring resonators and includes one ring resonator resonating at $\lambda_7$ and seven resonators resonating at null wavelengths $\lambda_\phi$ in the second group 1040b of ring resonators. Each group of ring resonators 1040a and 1040b is coupled to a corresponding detector 1044a and 1044b, each of which generates electrical signals for a comparator 1046 to generate one bit of digital information.

The fourth partial drop filter bank 1005 includes one ring resonator resonating at $\lambda_4$ and seven resonators resonating at null wavelengths $\lambda_\phi$ in the first group 1050a of ring resonators and includes one ring resonator resonating at $\lambda_8$ and seven resonators resonating at null wavelengths $\lambda_\phi$ in the second group 1050b of ring resonators. Each group of ring resonators 1050a and 1050b is coupled to a corresponding detector 1054a and 1054b, each of which generates electrical signals for a comparator 1056 to generate one bit of digital information.

FIG. 11 shows an optical receiver 100 to demodulate a four orthogonal frequencies in four different WDM bands, namely, a first wavelength $\lambda_1$ in the first WDM band, second wavelength $\lambda_2$ in the second WDM band, third wavelength $\lambda_3$ in the third WDM band, and fourth wavelength $\lambda_4$ in the fourth WDM band. The optical receiver 1100 includes an input waveguide 1110 to receive input signals and an array of ring resonators 1160 resonating at null wavelengths $\lambda_\phi$ to direct noise from the input signals into a drop port 1165. The pre-processed input signals then propagate in the input waveguide 1110 for subsequent demodulation, carried out by four partial drop filter banks 1102, 1103, 1104, and 1105.

The first partial drop filter bank 1102 includes one ring resonator resonating at $\lambda_1$ and seven ring resonator resonating at null wavelengths $\lambda_\phi$ as the first group 1120a and includes eight ring resonators resonating at null wavelengths $\lambda_\phi$ as the second group 1120b. Each group (1120a/b) has a corresponding detector 1124a/b to detect spectral components coupled out of the group of ring resonators. A comparator 1126 compares the two signals generated by the two detectors 1124a and 1124b to generate one bit of digital information.

The second partial drop filter bank 1103 includes one ring resonator resonating at $\lambda_2$ and seven ring resonator resonating at null wavelengths $\lambda_\phi$ as the first group 1130a and includes eight ring resonators resonating at null wavelengths $\lambda_\phi$ as the second group 1130b. Each group (1130a/b) has a corresponding detector 1134a/b to detect spectral components coupled out of the group of ring resonators. A comparator 1136 compares the two signals generated by the two detectors 1134a and 1134b to generate one bit of digital information.

The third partial drop filter bank 1104 includes one ring resonator resonating at $\lambda_3$ and seven ring resonator resonating at null wavelengths $\lambda_\phi$ as the first group 1140a and includes eight ring resonators resonating at null wavelengths $\lambda_\phi$ as the second group 1140b. Each group (1140a/b) has a corresponding detector 1144a/b to detect spectral components coupled out of the group of ring resonators. A comparator 1146 compares the two signals generated by the two detectors 1144a and 1144b to generate one bit of digital information.

The fourth partial drop filter bank 1105 includes one ring resonator resonating at $\lambda_4$ and seven ring resonator resonating at null wavelengths $\lambda_\phi$ as the first group 1150a and includes eight ring resonators resonating at null wavelengths $\lambda_\phi$ as the second group 1150b. Each group (1150a/b) has a corresponding detector 1154a/b to detect spectral components coupled out of the group of ring resonators. A comparator 1156 compares the two signals generated by the two detectors 1154a and 1154b to generate one bit of digital information.

Although the second groups of ring resonators 1120b, 1130b, 1140b, and 1150b include only noise rejection filters, the resonant wavelength may be different within each group. For example, in the second group 1120b in the first partial drop filter bank 1102, one noise rejection filter may resonate at a wavelength between $\lambda_1$ and $\lambda_2$, while another noise rejection filter may resonate at another wavelength between $\lambda_2$ and $\lambda_3$. Similarly, the noise rejection filters in the first groups 1120a, 1130a, 1140a, and 1150a may also have different resonant wavelengths.

Optical Receivers Including Variable Optical Attenuators

In the partial drop filter banks (e.g., 802-805, 902-905, 1002-1005, and 1102-1105) described above, the two groups of ring resonators within one partial drop filter bank usually have the same split ratio. However, fabrication imperfections or fluctuations of environmental parameters (e.g., temperature) may cause unequal split ratios for the two groups of ring resonators and accordingly introduce demodulation errors. Variable optical attenuators may be included to address this issue by balancing power levels incident on the detectors.

Figure 12:
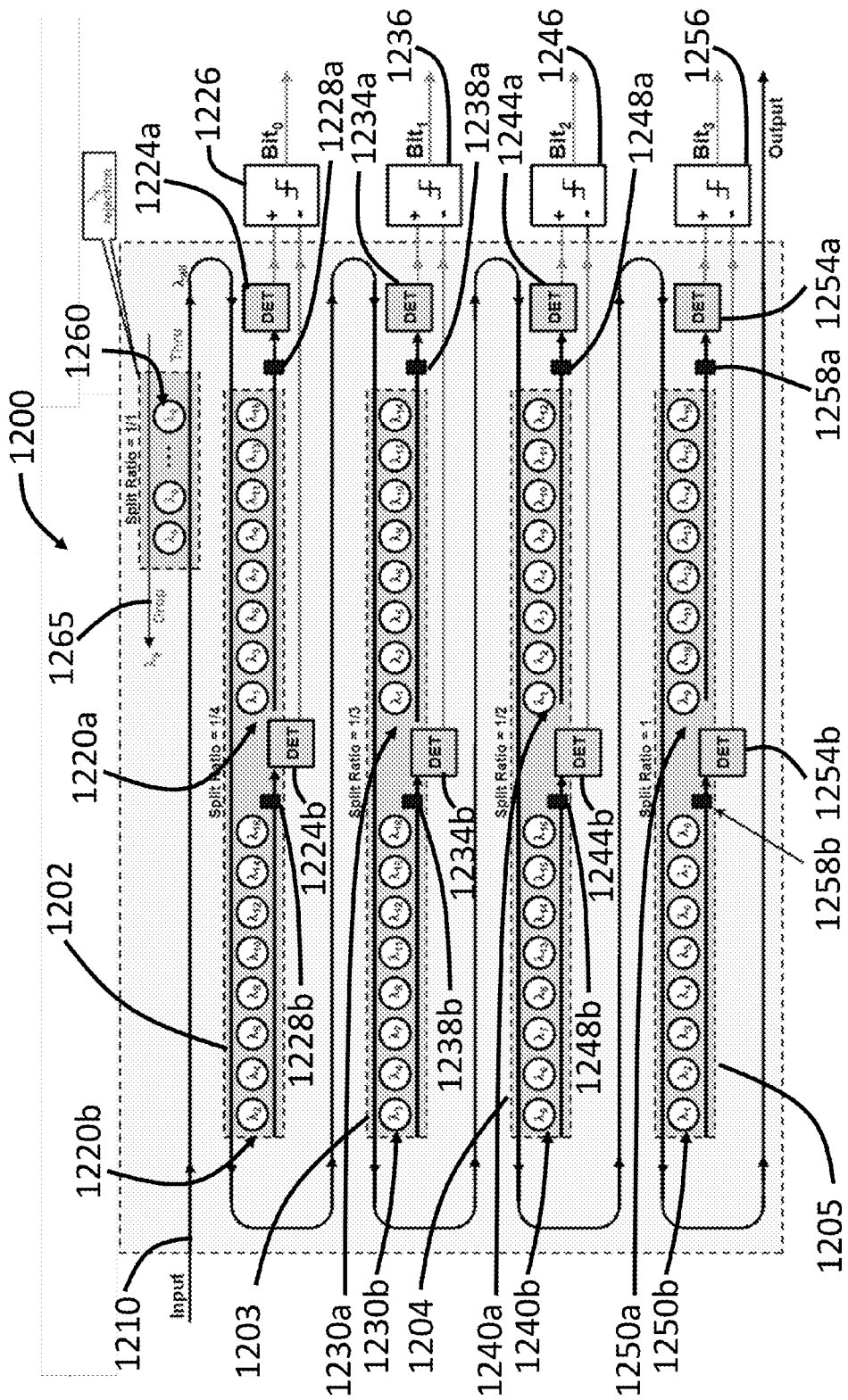
FIG. 12 shows a schematic of a ring-filtering-element based optical receiver including variable optical attenuation (VOA) elements.

FIG. 12 shows a schematic of an optical receiver 1200 including variable optical attenuators for power balance. The receiver 1200 includes an input waveguide 1210 to receive input signals for demodulation. An array of ring resonators resonating 1260 at null wavelengths $\lambda_\phi$ is evanescently coupled to the input waveguide 1210 for noise rejection and the rejected noise is transmitted out of the input waveguide 1210 via a drop port 1265 also evanescently coupled to the ring resonators 1265. Four partial drop filter banks 1202, 1203, 1204, and 1205 then couple out different spectral components from the input signal to create intermediary signals for demodulation.

Each partial drop filter bank 1202-1205 also includes two groups of ring resonators (1220a/b, 1230a/b, 1240a/b, and 1250a/b) and two corresponding detectors (1224a/b, 1234a/b, 1244a/b, and 1254a/b) to detect spectral components coupled out by the two groups of ring resonators. A corresponding comparator (1226, 1236, 1246, and 1256) then compares each pair of signals generated by each pair of detectors (1224a/b, 1234a/b, 1244a/b, and 1254a/b) to generate a total of four bits of digital information. Between each group of ring resonators, there is a variable optical attenuator (1228a/b, 1238a/b, 1248a/b, and 1258a/b) that may adjust the power of the spectral components coupled out by each group of ring resonators. These variable optical attenuators (1228a/b, 1238a/b, 1248a/b, and 1258a/b) may allow the detectors in each pair of detectors (1224a/b, 1234a/b, 1244a/b, and 1254a/b) to receive substantially the same optical power so as to allow reliable demodulation. In addition, by slightly detuning the filtering elements in the four partial drop filter banks 1202, 1203, 1204, and 1205, one may also attenuate the optical signal, reducing the need for separate VOAs.

The four partial drop filter banks 1202-1205 are similar or identical to the four partial drop filter banks 602-605 shown in FIG. 6. The first partial drop filter bank 1202 includes 16 ring resonators that are divided into two groups. The first group of ring resonators 1220a includes eight ring resonators resonating at $\lambda_1$, $\lambda_3$, $\lambda_5$, $\lambda_7$, $\lambda_9$, $\lambda_{11}$, $\lambda_{13}$, and $\lambda_{15}$, respectively, and the second group of ring resonators 1220b includes eight ring resonators resonating at $\lambda_2$, $\lambda_4$, $\lambda_6$, $\lambda_8$, $\lambda_{10}$, $\lambda_{12}$, $\lambda_{14}$, and $\lambda_{16}$, respectively.

The second partial drop filter bank 1203 also includes two groups of 16 ring resonators. The first group of ring resonators 1230a includes eight ring resonators resonating at $\lambda_1$, $\lambda_2$, $\lambda_5$, $\lambda_6$, $\lambda_9$, $\lambda_{10}$, $\lambda_{13}$, and $\lambda_{14}$, respectively, and the second group of ring resonators 1230b includes eight ring resonators resonating at $\lambda_3$, $\lambda_4$, $\lambda_7$, $\lambda_8$, $\lambda_{11}$, $\lambda_{12}$, $\lambda_{15}$, and $\lambda_{16}$, respectively.

The first group of ring resonators 1240a in the third partial drop filter bank 1204 includes eight ring resonators resonating at $\lambda_1$, $\lambda_2$, $\lambda_3$, $\lambda_4$, $\lambda_9$, $\lambda_{10}$, $\lambda_{11}$, and $\lambda_{12}$, respectively, and the second group of ring resonators 1240b includes eight ring resonators resonating at $\lambda_5$, $\lambda_6$, $\lambda_7$, $\lambda_8$, $\lambda_{13}$, $\lambda_{14}$, $\lambda_{15}$, and $\lambda_{16}$, respectively.

The first group of ring resonators 1250a in the fourth partial drop filter bank 1205 includes eight ring resonators resonating at $\lambda_9$, $\lambda_{10}$, $\lambda_{11}$, $\lambda_{12}$, $\lambda_{13}$, $\lambda_{14}$, $\lambda_{15}$, and $\lambda_{16}$, respectively, and the second group of ring resonators 1250b includes eight ring resonators resonating at $\lambda_1$, $\lambda_2$, $\lambda_3$, $\lambda_4$, $\lambda_5$, $\lambda_6$, $\lambda_7$, and $\lambda_8$, respectively.

Various types of variable optical attenuators may be used here. In one example, the variable optical attenuators may include absorption-based attenuators, in which continuously variable attenuation may be realized with a filter wheel (also referred to as an optical attenuator wheel), where the amount of absorption varies along a circle around the axis of rotation. In another example, the variable optical attenuators may include reflection-based attenuators such as a reflector having a variable reflectance depending on the incident angle. In yet another example, the variable optical attenuators may include polarization-based attenuators, such as a half wave plate in combination with a polarizer. In yet another example, the variable optical attenuators may include fiber-optic attenuators, such as fiber couplers that may direct some of the incident power toward an output port that is not connected with the detectors. In yet another example, the variable optical attenuators include filter-based attenuators such as Mach-Zehnder or ring resonator tuned via free-carrier absorption (FCA), carrier depletion, or temperature via thermo-optic effect. In yet another example, the variable optical attenuators may use direct attenuation via FCA, bend-loss attenuators, and/or Micro-Electro-Mechanical Systems (MEMS) based attenuators using deflection of coupling mechanisms. Variable coupling losses may also be employed to build a variable optical attenuator, in which one may vary the transverse position of the output fiber or the width of an air gap between two fibers to adjust the transmitted power.

Optical Receivers Including Differential Phase Comparison Elements

The optical receivers described above may further de-interleave the input signal into odd and even channels to separate adjacent channels and therefore reduce isolation-limited channel spacing. By de-interleaving the input signals, the approaches described herein may also simultaneously demodulate multiple WDM differentially-encoded phase-shift-key (DPSK) signals. The de-interleaving may be achieved by differential phase comparison elements, which may be defined as optical elements with outputs that are sensitive to the relative phase of the input signals (e.g., same phase signals are sent to the thru port and out-of-phase signals are sent to the drop port). In the description below, delay-line interferometers (also known as unbalanced MZIs) are used for illustrative purposes to describe the de-interleaving, but other differential phase comparison elements may also be used.

Figure 13:
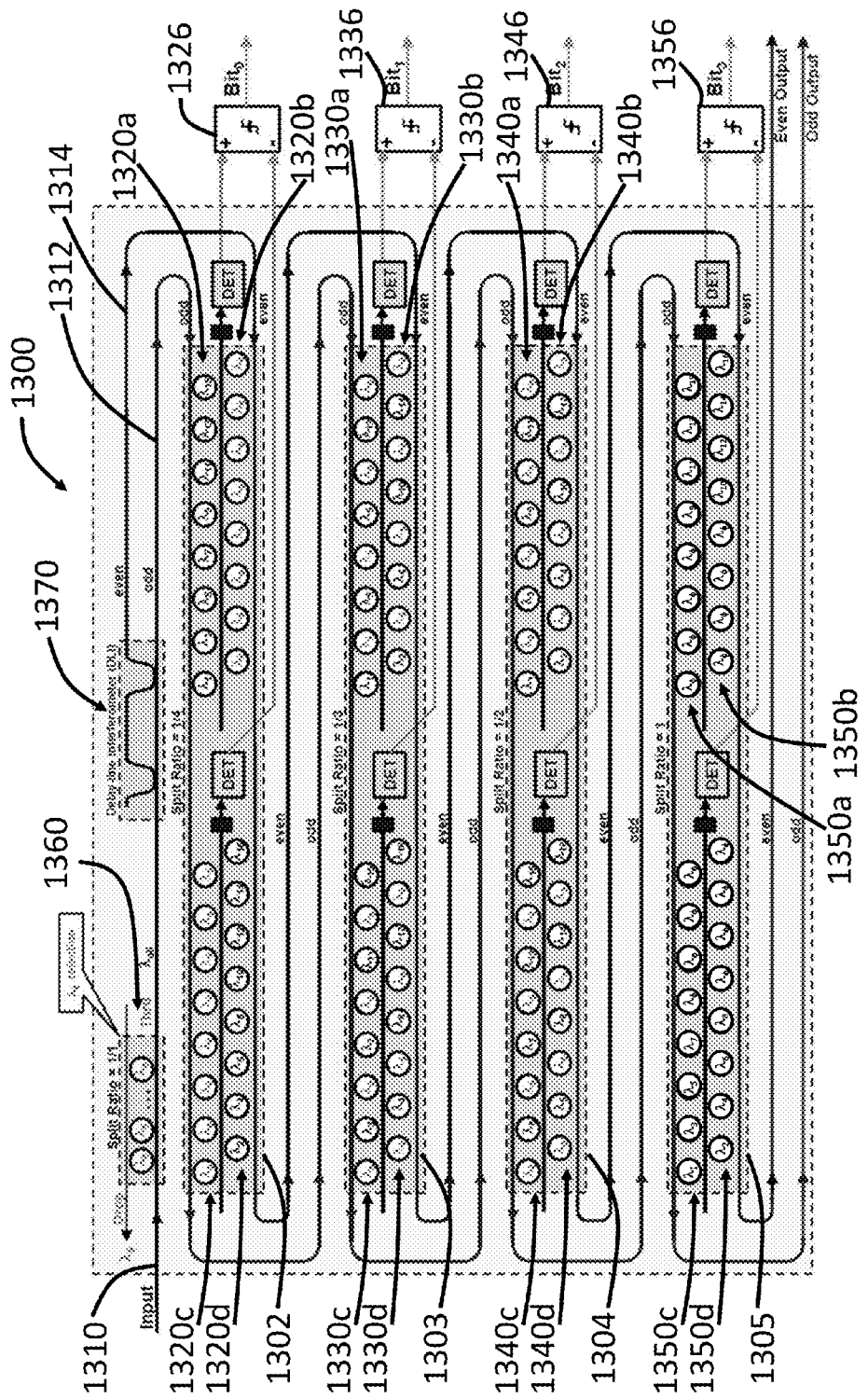
FIG. 13 shows a schematic of a ring-filtering-element based optical receiver including a delay-line interferometer to create de-interleaved channels for demodulation.

FIG. 13 shows a schematic of an optical receiver including a delay-line interferometer 1370 that may de-interleave two periodic sets of wavelengths (an odd set and an even set) for subsequent demodulation. The receiver 1300 includes an input waveguide 1310 to receive input signals. An array of ring resonators 1360 resonating at null wavelengths $\lambda_\phi$ may be evanescently coupled to the input waveguide 1310 for preliminary noise rejection. The cleaned input signals (with null wavelength power removed) then propagate into a delay-line interferometer 1370 which splits the input signals into an odd channel 1312 and an even channel 1314 for subsequent demodulation, which are carried out by four partial drop filter banks 1302, 1303, 1304, and 1305. Each partial drop filter bank 1302-1305 includes 32 ring resonators, out of which 16 ring resonators are evanescently coupled to the odd channel 1312 and the other 16 ring resonators are evanescently coupled to the even channel 1314.

In the first partial drop filter bank 1302, eight ring resonators resonating at $\lambda_1$, $\lambda_3$, $\lambda_5$, $\lambda_7$, $\lambda_9$, $\lambda_{11}$, $\lambda_{13}$, and $\lambda_{15}$ (also referred to as partial drop filters) form a first group 1320a evanescently coupled to the odd channel 1312. Another eight ring resonators aligned to the null wavelengths $\lambda_\phi$ (where all power has already been removed) form a second group 1320b evanescently coupled to the even channel 1314. Both groups 1320a and 1320b are also evanescently coupled to a common output waveguide to transmit spectral components coupled out by these two groups of ring resonators into a detector. The first partial drop filter bank 1302 also includes a third group 1320c of eight ring resonators resonating at $\lambda_2$, $\lambda_4$, $\lambda_6$, $\lambda_8$, $\lambda_{10}$, $\lambda_{12}$, $\lambda_{14}$, and $\lambda_{16}$, respectively, which are evanescently coupled to the even channel 1314, and a fourth group 1320d of eight ring resonators resonating at null wavelengths $\lambda_\phi$, which are coupled to the even channel 1312. Similarly, both the third group 1320c and the fourth group 1320d are coupled to a common output waveguide leading to a detector. A comparator 1326 then compares the signals acquired by the two detectors to generate one bit of digital information.

The second partial drop filter bank 1303 also includes four groups of ring resonators. The first group 1330a is evanescently coupled to the odd channel 1312 and includes four partial drop filters resonating at $\lambda_1$, $\lambda_5$, $\lambda_9$, and $\lambda_{13}$ and four filters aligned to a null wavelength $\lambda_\phi$. The second group 1330b is evanescently coupled to the even channel 1314 and includes four partial drop filters resonating at $\lambda_2$, $\lambda_6$, $\lambda_{10}$, and $\lambda_{14}$ and four filters aligned to a null wavelength $\lambda_\phi$. The first group 1330a and second group 1330b share a common output waveguide leading to a detector. The third group 1330c is evanescently coupled to the odd channel 1312 and includes four partial drop filters resonating at $\lambda_3$, $\lambda_7$, $\lambda_{11}$, and $\lambda_{15}$ and four filters aligned to a null wavelength $\lambda_\phi$. The fourth group 1330d is evanescently coupled to the even channel 1314 and includes four partial drop filters resonating at $\lambda_4$, $\lambda_8$, $\lambda_{12}$, and $\lambda_{16}$ and four filters aligned to a null wavelength $\lambda_\phi$. The third group 1330a and fourth group 1330b share a common output waveguide leading to a detector. A comparator 1336 is coupled to the two detectors to generate a second bit of digital information.

The four groups of ring resonators 1340a, 1340b, 1340c, and 1340d in the third partial drop filter bank 1304 are arranged as follows. The first group 1340a is evanescently coupled to the odd channel 1312 and includes four partial drop filters resonating at $\lambda_1$, $\lambda_3$, $\lambda_9$, and $\lambda_{11}$ and four filters aligned to a null wavelength $\lambda_\phi$. The second group 1340b is evanescently coupled to the even channel 1314 and includes four partial drop filters resonating at $\lambda_2$, $\lambda_4$, $\lambda_{10}$, and $\lambda_{12}$ and four filters aligned to a null wavelength $\lambda_\phi$. The third group 1340c is evanescently coupled to the odd channel 1312 and includes four partial drop filters resonating at $\lambda_5$, $\lambda_7$, $\lambda_{13}$, and $\lambda_{15}$ and four filters aligned to a null wavelength $\lambda_\phi$. The fourth group 1340d is evanescently coupled to the even channel 1314 and includes four partial drop filters resonating at $\lambda_6$, $\lambda_8$, $\lambda_{14}$, and $\lambda_{16}$ and four filters aligned to a null wavelength $\lambda_\phi$. The first group 1340a and second group 1340b share a first output waveguide leading to a first detector, while the third group 1340c and fourth group 1340d share a second output waveguide leading to a second detector. A comparator 1346 is coupled to the two detectors to generate a third bit of digital information.

The four groups of ring resonators 1350a, 1350b, 1350c, and 1350d in the fourth partial drop filter bank 1305 are arranged as following. The first group 1350a is evanescently coupled to the odd channel 1312 and includes four partial drop filters resonating at $\lambda_9$, $\lambda_{11}$, $\lambda_{13}$, and $\lambda_{16}$ and four filters aligned to a null wavelength $\lambda_\phi$. The second group 1350b is evanescently coupled to the even channel 1314 and includes four partial drop filters resonating at $\lambda_{10}$, $\lambda_{12}$, $\lambda_{14}$, and $\lambda_{16}$ and four filters aligned to a null wavelength $\lambda_\phi$. The third group 1350c is evanescently coupled to the odd channel 1312 and includes four partial drop filters resonating at $\lambda_1$, $\lambda_3$, $\lambda_5$, and $\lambda_7$ and four filters aligned to a null wavelength $\lambda_\phi$. The fourth group 1350d is evanescently coupled to the even channel 1314 and includes four partial drop filters resonating at $\lambda_2$, $\lambda_4$, $\lambda_6$, and $\lambda_8$ and four filters aligned to a null wavelength $\lambda_\phi$. The first group 1350a and second group 1350b share a first output waveguide leading to a first detector, while the third group 1350c and fourth group 1350d share a second output waveguide leading to a second detector. A comparator 1356 is coupled to the two detectors to generate a third bit of digital information.

Figure 14:
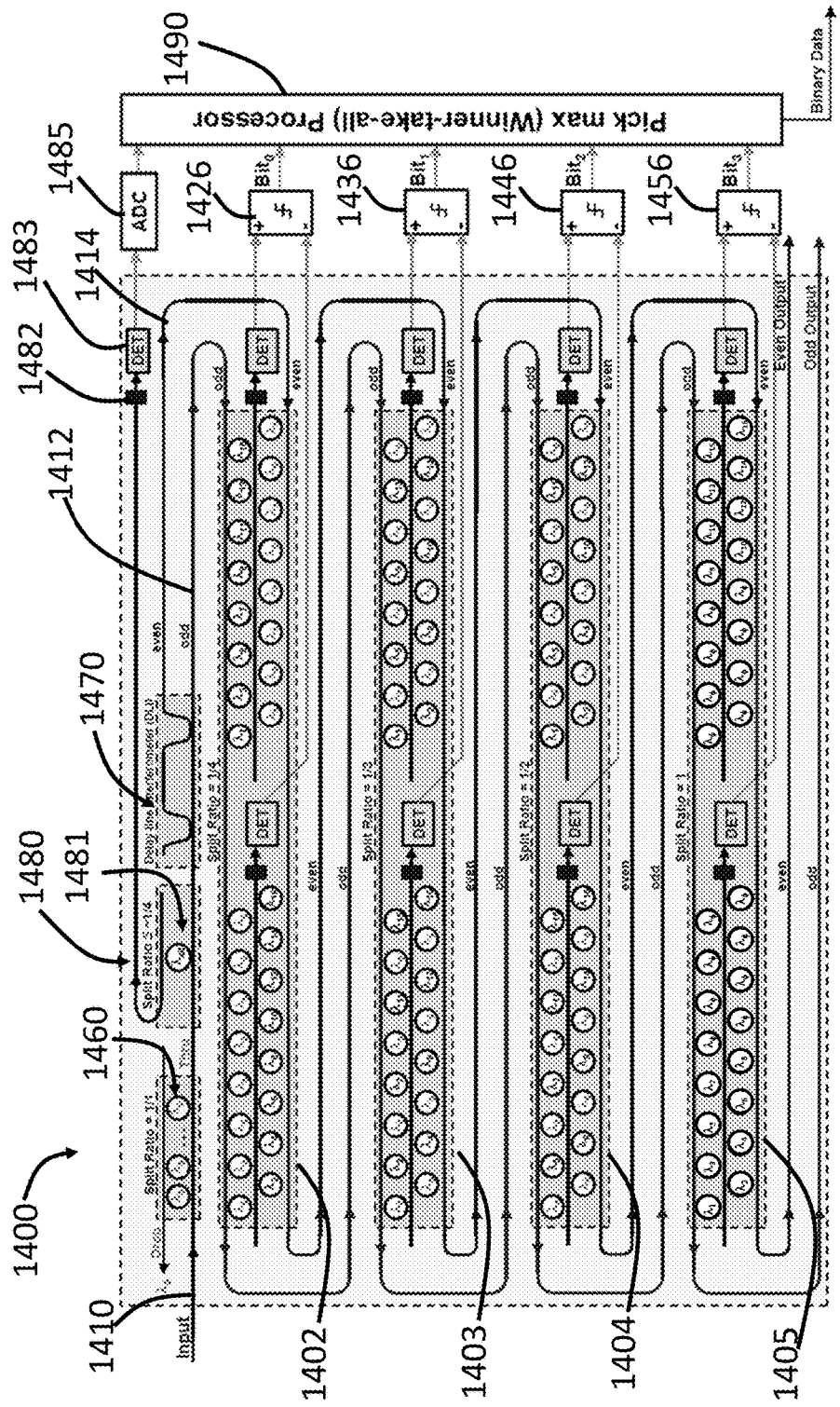
FIG. 14 shows a schematic of a ring-filtering-element optical receiver including a level estimator.

FIG. 14 shows a schematic of an optical receiver 1400 including a level estimator 1480. The receiver 1400 includes an input waveguide 1410 to receive input signals, which propagate through an initial noise rejection filter 1460 that may couple out spectral components at null wavelengths $\lambda_\phi$. The input signals after initial noise rejection then propagate through a splitter 1481, which includes a ring resonator that may couple a portion of the input signals to a variable optical attenuator 1482 and a detector 1483. The signal acquired by the detector 1483 is then transmitted to an Analog-to-Digital Converter (ADC) 1485 to be converted into a digital signal that may function as a confidence level of logical representations of the input signals. The splitter 1481, the variable optical attenuator 1482, the detector 1483, and the ADC 1485 form the level estimator 1480. Alternatively, the level estimator 1480 may include more or less components (e.g., without the variable optical attenuator 1482). In one example, the portion coupled out by the splitter 1480 may be substantially equal to ¼. In another example, the portion coupled out by the splitter 1480 may be less than ¼ or greater than ¼ and the optical power received by the detector 1483 may be further adjusted by the variable optical attenuator 1482.

The splitter 1481 is also referred to as an all channel filtering element. The splitter 1481 as shown in FIG. 14 includes a single ring resonator for illustrative purposes. In practice, various other all channel filtering elements may also be used. For example, the splitter 1481 may include a group of periodic ring resonators with many resonant wavelengths. In another example, the splitter 1481 includes a broad-band filter that may pass all the channels. In addition, the splitter 1481 may not have a resonant wavelength. For example, the splitter 1481 may include a broad-band power tap such as an optical splitter or a balanced Mach-Zehnder interferometer (MZI), without any specific resonant wavelength.

After the splitter 1480, the input signals propagate into a delay line interferometer 1470, which splits the input signals into an odd channel 1412 and an even channel 1414. Four partial drop filter banks 1402, 1403, 1404, and 1405 then demodulate the input signals propagating in the odd channel 1412 and the even channel 1414. Each partial drop filter bank 1402 to 1405 produces a bit of digital information by a respective comparator (1426, 1436, 1446, and 1456). The arrangement of the four partial drop filter banks 1402, 1403, 1404, and 1405 may be substantially the same as the four partial drop filter banks 1302, 1303, 1304, and 1305 in the optical receiver 1300 and are not described in details. The digital information created by the ADC 1485 and the four comparators (1426, 1436, 1446, and 1456) is all transmitted to a processor 1490, which may take into account the confidence level and the digital bits to generate the demodulate signal.

Figure 15:
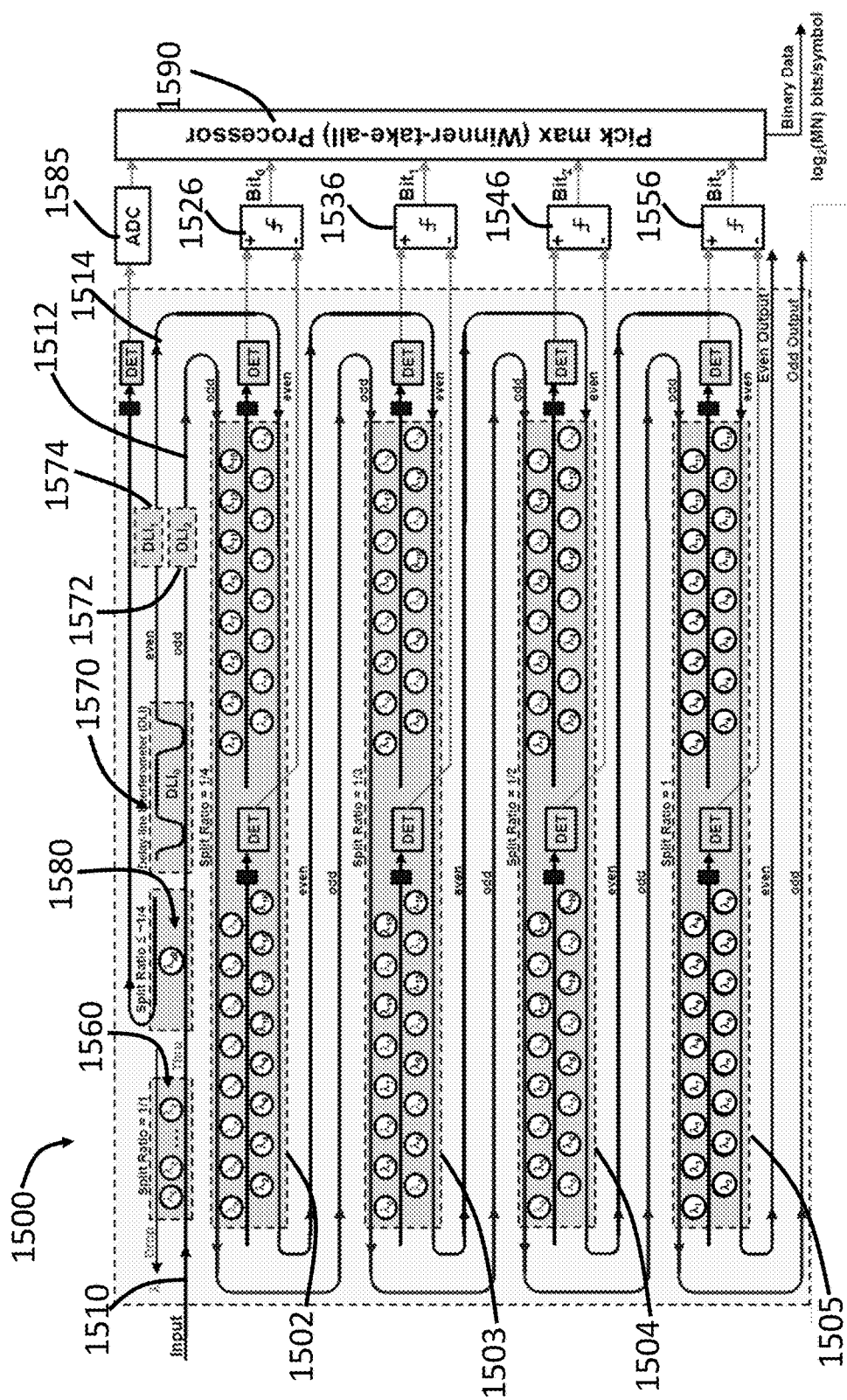
FIG. 15 shows a schematic of a ring-filtering-element based optical receiver including a delay-line interferometer to create de-interleaved channels for demodulation and additional delay-line interferometers on each created channel.

FIG. 15 shows a schematic of an optical receiver 1500 including a delay-line interferometer 1570 to create an odd channel and an even channel, each of which further includes an additional delay-line interferometer (1572 and 1574). The receiver 1500 includes an input waveguide 1510 to receive input signals and an initial noise rejection filter 1560 to couple out spectral components at null wavelengths $\lambda_\phi$. A splitter 1580 includes a ring resonator to couple a portion of the spectral components in input signals after this initial noise rejection. An ADC 1585 generates a confidence level of logical representations of the input signals, based on the portion of input signal coupled out by the splitter 1580. The ADC may also provide time-dependent signal power information that may be used, for example, to determine which time-sample within a p-slot PPM symbol is largest—thereby providing the time-domain input that may demodulate p-ary PPM. For hybrid p-PPM/f-FSK symbols, for example p=16, and f=16, which conveys 8 bits per symbol, bits 0 to 3 may represent the demodulated 16-FSK portion of the hybrid symbol that is determined by which frequency is largest, and bits 4 to 7 may be used represent the demodulated 16-PPM portion of the hybrid symbol determined by which time slot is largest. The ADC in this example enables the pick max processor 1590 to determine the amplitude and arrival time of the f-FSK symbol. Note that in this example, the 8-bit hybrid 16-FSK/16-PPM symbols convey as much information as 16×16 or 256-ary orthogonal modulation. They also provide the sensitivity benefits of 256-ary orthogonal, since roughly the same number of photons needed to demodulate a 16-FSK symbol with 4-bits may be used to demodulate the 8-bits conveyed by the 16×16 hybrid symbol. With roughly the same number of photons with twice the bits, this corresponds to a sensitivity improvement of nearly a factor of two or 3 dB.

After the splitter 1580, the input signals propagate into a delay line interferometer 1570, which splits the input signals into an odd channel 1512 and an even channel 1514. The odd channel 1512 includes a first delay-line interferometer 1572 and the even channel 1514 includes a second delay-line interferometer 1574. The free spectral range (FSR) of the delay-line interferometer 1570 may be a function of the WDM channel spacing. The FSR of the first delay-line interferometer 1572 and the second delay-line interferometer 1574 may depend on the data rate such that they may demodulate differential phase shift keying (DPSK) or multiple WDM-DPSK signals.

Four partial drop filter banks 1502, 1503, 1504, and 1505 then demodulate the input signals propagating in the odd channel 1512 and the even channel 1514. Each partial drop filter bank 1502 to 1505 produces a bit of digital information by a respective comparator (1526, 1536, 1546, and 1556). The arrangement of the four partial drop filter banks 1502, 1503, 1504, and 1505 may be substantially the same as the four partial drop filter banks 1302, 1303, 1304, and 1305 in the optical receiver 1300 and are not described in details. The digital information created by the ADC 1585 and the four comparators (1526, 1536, 1546, and 1556) is all transmitted to a processor 1590, which may take into account the confidence level and the digital bits to generate the demodulate signal.

Optical Receivers Including 1×N Splitters

The optical receivers described above may use partial drop filters to couple out spectral components in input signals. Alternatively, full drop filters may also be used to construct optical receivers by incorporating 1×N splitters, where N is the number of filter banks in an optical receiver.

Figure 16:
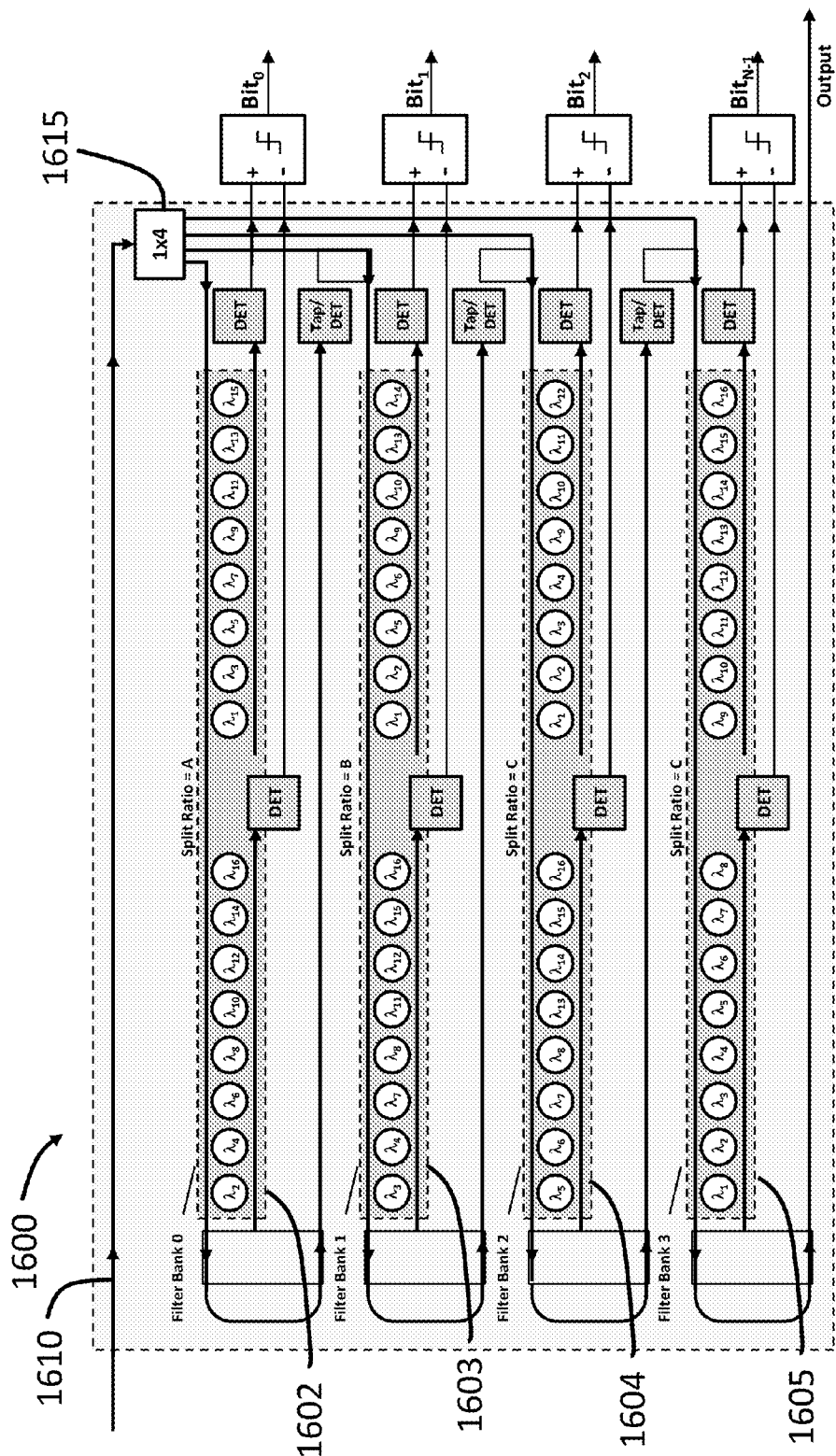
FIG. 16 shows a schematic of an optical receiver including a 1×4 optical power splitting element that distributes the incoming optical signals to four banks of optical filtering elements for demultiplexing and demodulating a 16-ary FSK modulated signal.

FIG. 16 shows a schematic of an optical receiver 1600 to demodulate 16-ary input signals using four full drop filter banks. The receiver 1600 includes an input waveguide 1600 to receive input signals. A 1×4 splitter 1615 is operably coupled to the input waveguide 1610 to split the input signals into four portions, each of which is transmitted to a respective filter bank 1602, 1603, 1604, and 1605, respectively. The filter banks 1602 to 1605 may be similar to the four partial drop filter banks 602-605 shown in FIG. 6, except that ring resonators in the filter banks 1602 to 1605 may couple out spectral components at a 100% split ratio. In other words, the filter banks 1602 to 1605 may be full drop filter banks.

Figure 17:
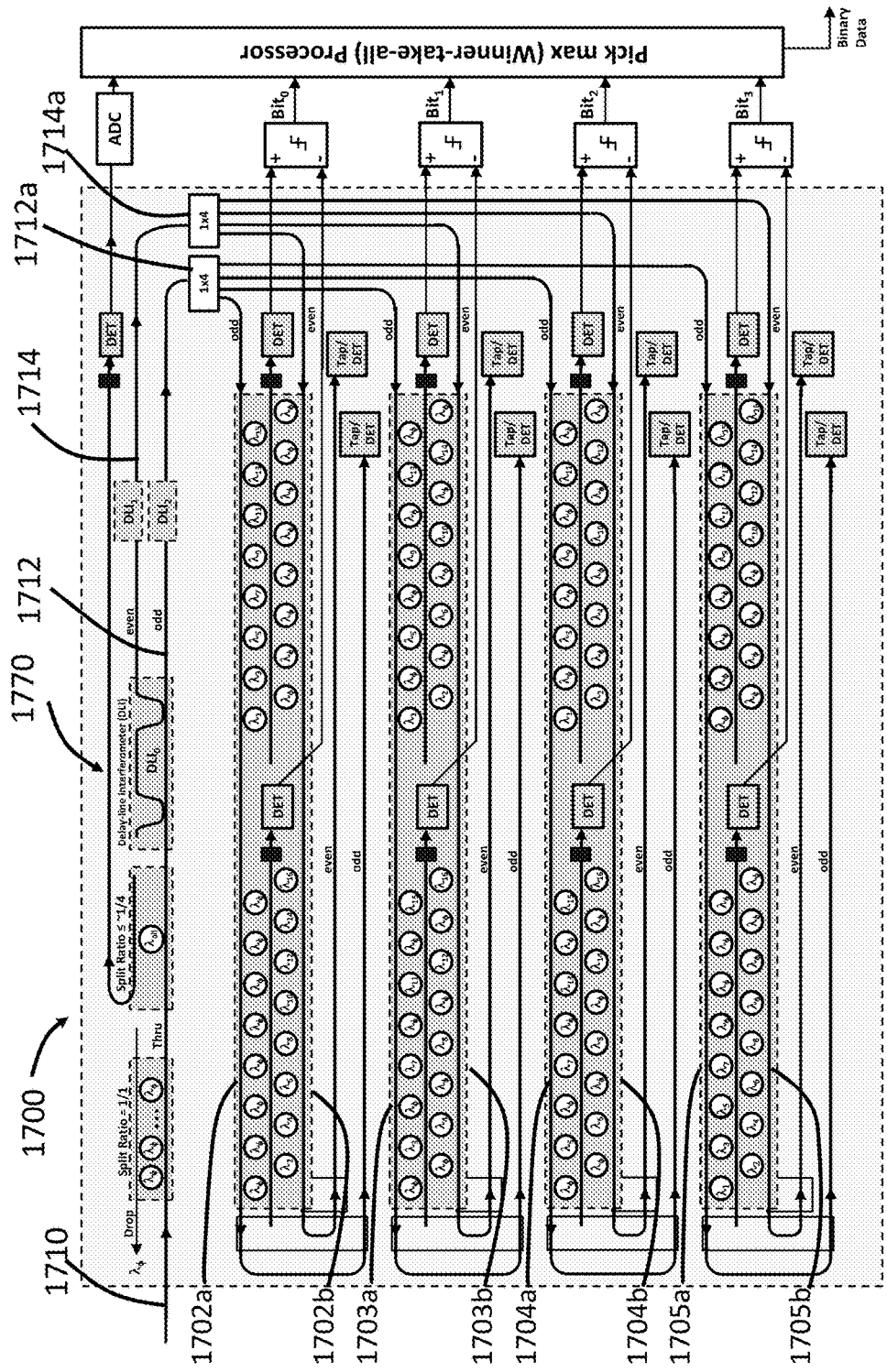
FIG. 17 shows a schematic of an optical receiver including two 1×4 optical power splitting elements that distribute the two de-interleaved incoming optical signals to four banks of optical filtering elements for demultiplexing and demodulating a 16-ary FSK modulated signal.

FIG. 17 shows a schematic of an optical receiver 1700 to demodulate 16-ary input signals using de-interleaved channels and full drop filter banks. The receiver 1700 includes an input waveguide 1710 to receive input signals. A delay-line interferometer 1770, optically coupled to the input waveguide 1710, split the input signals into an odd channel 1712 and an even channel 1714. The odd channel 1712 has a 1×4 splitter 1712a to split the input signals into four portions, each of which is transmitted to a respective odd filter bank 1702a, 1703a, 1704a, and 1705a, respectively. The even channel 1714 also has a 1×4 splitter 1714a to split the input signals into four portions, each of which is transmitted to a respective even filter bank 1702b, 1703b, 1704b, and 1705b, respectively. Each odd filter bank (1702a to 1705a) couples out spectral components from the odd channel 1712 and each even filter bank (1702b to 1705b) couples out spectral components from the even channel 1714. Each pair of odd filter bank (1702a to 1705a) and even filter bank (1702b to 1705b) may be collectively referred to as a filter bank 1702 to 1705, which may be similar to the four partial drop filter banks 1302-1305 shown in FIG. 13, except that ring resonators in the filter banks 1702 to 1705 may couple out spectral components at a 100% split ratio. In other words, the filter banks 1702 to 1705 may be full drop filter banks.

The optical receiver 1700 shown in FIG. 17 includes several waveguide crossings between the 1×4 splitter outputs and the filter banks. These crossings are optional and are a result of drawing convenience (e.g., having the outputs of both 1×4 splitters enter the filter banks directly from the right hand side). Alternative routing of the 1×4 splitter outputs from both left and right hand sides can be implemented without any waveguide crossings. Optical receivers shown in FIGS. 1-16 do not include waveguide crossings, which is one of the benefits of these designs.

Conclusion

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of designing and making the technology disclosed herein may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes (outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A demodulator comprising:
   an input waveguide to receive a wavelength division multiplexed (WDM) input signal;
   a first plurality of filtering elements, optically coupled to the input waveguide, to couple out of the input waveguide, at a first split ratio substantially equal to or less than 0.5, light at each of a first plurality of possible wavelengths in the WDM input signal;
   a first detector, optically coupled to the first plurality of filtering elements, to generate a first detector signal in response to the light coupled out of the input waveguide by the first plurality of filtering elements;
   a second plurality of filtering elements, optically coupled to the input waveguide, to couple out, at the first split ratio, light at each of a second plurality of possible wavelengths in the WDM input signal, the second plurality of possible wavelengths being different than the first plurality of possible wavelengths;
   a second detector, optically coupled to the second plurality of filtering elements, to generate a second detector signal in response to the light coupled out of the input waveguide by the second plurality of filtering elements; and
   a first comparator, operably coupled to the first detector and the second detector, to generate a first bit of a demodulated signal of the WDM input signal based on a comparison of the first detector signal and the second detector signal.

2. The demodulator of claim 1, wherein the WDM input signal is modulated with frequency-shift keying (FSK) modulation at a plurality of carrier wavelengths.

3. The demodulator of claim 2, further comprising:
a noise rejection filtering element, optically coupled to the input waveguide before the first plurality of filtering elements, to reject noise in the WDM input signal, the noise rejection filtering element having an operation wavelength different from the plurality of carrier wavelengths.

4. The demodulator of claim 2, further comprising:
an actuator, operably coupled to the first plurality of filtering elements, to tune a first filtering element in the first plurality of filtering elements between a first operation wavelength matching a first carrier wavelength in the plurality of carrier wavelengths and a second operation wavelength between an adjacent pair of carrier wavelengths in the plurality of carrier wavelengths.

5. A demodulator comprising:
an input waveguide to receive a wavelength division multiplexed (WDM) input signal;
a first plurality of filtering elements, optically coupled to the input waveguide, to couple out of the input waveguide, at a first split ratio substantially equal to or less than 0.5, light at each of a first plurality of possible wavelengths in the WDM input signal;
a first detector, optically coupled to the first plurality of filtering elements, to generate a first detector signal in response to the light coupled out of the input waveguide by the first plurality of filtering elements;
a second plurality of filtering elements, optically coupled to the input waveguide, to couple out, at the first split ratio, light at each of a second plurality of possible wavelengths in the WDM input signal, the second plurality of possible wavelengths being different than the first plurality of possible wavelengths;
a second detector, optically coupled to the second plurality of filtering elements, to generate a second detector signal in response to the light coupled out of the input waveguide by the second plurality of filtering elements;
a first comparator, operably coupled to the first detector and the second detector, to generate a first bit of a demodulated signal of the WDM input signal based on a comparison of the first detector signal and the second detector signal;
a third plurality of filtering elements, optically coupled to the input waveguide, to couple out of the input waveguide, at a second split ratio, light at each of a third plurality of possible wavelengths in the WDM input signal;
a third detector, optically coupled to the third plurality of filtering elements, to generate a third detector signal in response to the light coupled out of the input waveguide by the third plurality of filtering elements;
a fourth plurality of filtering elements, optically coupled to the input waveguide, to couple out, at the second split ratio, light at each of a fourth plurality of possible wavelengths in the WDM input signal, the fourth plurality of possible wavelengths being different than the third plurality of possible wavelengths;
a fourth detector, optically coupled to the fourth plurality of filtering elements, to generate a fourth detector signal in response to the light coupled out of the input waveguide by the fourth plurality of filtering elements; and a second comparator, operably coupled to the third detector and the fourth detector, to generate a second bit of the demodulated signal of the WDM input signal based on a comparison of the third detector signal and the fourth detector signal.

6. The demodulator of claim 5, wherein:
the first plurality of possible wavelengths comprises a first wavelength $\lambda_1$ and a second wavelength $\lambda_2$;
the second plurality of wavelengths comprises a third wavelength $\lambda_3$ and a second wavelength $\lambda_4$;
the third plurality of possible wavelengths comprises the first wavelength $\lambda_1$ and the third wavelength $\lambda_3$; and
the fourth plurality of possible wavelengths comprises the second wavelength $\lambda_2$ and the fourth wavelength $\lambda_4$.

7. The demodulator of claim 5, wherein the first split ratio is substantially equal to 0.5 and the second split ratio is substantially equal to 1.

8. The demodulator of claim 1, further comprising:
a differential phase comparison element to receive the WDM input signal, the differential phase comparison element further configured to transmit a first portion of the WDM input signal to the input waveguide and to transmit a second portion of the WDM input signal to a reference input waveguide; and
a third plurality of filtering elements, optically coupled to the reference input waveguide and the first detector, to couple out of the reference input waveguide, at a third split ratio, light at each of a third plurality of wavelengths; and
a fourth plurality of filtering elements, optically coupled to the reference input waveguide and the second detector, to couple out of the reference input waveguide, at a fourth split ratio, light at each of a fourth plurality of wavelengths.

9. The demodulator of claim 1, further comprising:
a variable optical attenuator, disposed between the first plurality of filtering elements and the first detector, to change an intensity of the light coupled out of the input waveguide by the first plurality of filtering elements.

10. The demodulator of claim 1, wherein the first plurality of filtering elements comprises a first plurality of ring resonators.

11. The demodulator of claim 10, further comprising:
an actuator, operably coupled to at least one ring resonator in the first plurality of ring resonators, to change a resonant wavelength of the at least one ring resonator.

12. The demodulator of claim 11, wherein the actuator is configured to change the resonant wavelength by applying at least one of a mechanical force, an electric field, a magnetic field, an acoustic field, or a thermal field to the at least one ring resonator.

13. The demodulator of claim 1, further comprising:
an all-channel filtering element, optically coupled to the input waveguide before the first plurality of filtering elements, to couple out a reference portion of the WDM input signal;
a reference detector, optically coupled to the all-channel filtering element, to detect the reference portion of the WDM input signal; and
a processor, operably coupled to the reference detector and the comparator, to determine the demodulated signal based at least in part on the reference portion of the WDM input signal.

14. A method of demodulating a wavelength-division multiplexed (WDM) input signal, the method comprising:
coupling the WDM input signal into an input waveguide;

coupling out, at a first split ratio, light at each of a first plurality of possible wavelengths in the WDM input signal using a first plurality of filtering elements optically coupled to the input waveguide;

generating a first detector signal in response to the light coupled out of the input waveguide by the first plurality of filtering elements;

coupling out, at the first split ratio, light at each of a second plurality of possible wavelengths in the WDM input signal using a second plurality of filtering elements optically coupled to the input waveguide, the second plurality of possible wavelengths being different than the first plurality of possible wavelengths;

generating a second detector signal in response to the light coupled out of the input waveguide by the second plurality of filtering elements; and generating a first bit in a demodulated signal based at least in part on comparing the first detector signal and the second detector signal.

15. The method of claim 14, wherein the WDM input signal is modulated with a frequency-shift keying (FSK) modulation at a plurality of carrier wavelengths.

16. The method of claim 15, further comprising:
removing noise from the WDM input signal using a noise rejection filtering element optically coupled to the input waveguide before the first plurality of filtering elements, the noise rejection filtering element having a resonant wavelength different from the plurality of carrier wavelengths.

17. The method of claim 15, further comprising:
tuning a first filtering element in the first plurality of filtering elements between a first operation wavelength matching a first carrier wavelength in the plurality of carrier wavelengths and a second operation wavelength between an adjacent pair of carrier wavelengths in the plurality of carrier wavelengths.

18. A method of demodulating a wavelength-division multiplexed (WDM) input signal, the method comprising:
coupling the WDM input signal into an input waveguide;
coupling out, at a first split ratio, light at each of a first plurality of possible wavelengths in the WDM input signal using a first plurality of filtering elements optically coupled to the input waveguide;
generating a first detector signal in response to the light coupled out of the input waveguide by the first plurality of filtering elements;
coupling out, at the first split ratio, light at each of a second plurality of possible wavelengths in the WDM input signal using a second plurality of filtering elements optically coupled to the input waveguide, the second plurality of possible wavelengths being different than the first plurality of possible wavelengths;
generating a second detector signal in response to the light coupled out of the input waveguide by the second plurality of filtering elements;

generating a first bit in a demodulated signal based at least in part on comparing the first detector signal and the second detector signal;

coupling out, at a second split ratio, light at each of a second plurality of possible wavelengths in the WDM input signal using a third plurality of filtering elements optically coupled to the input waveguide;

generating a third detector signal in response to the light coupled out of the input waveguide by the third plurality of filtering elements;

coupling out, at the second split ratio, light at each of a fourth plurality of possible wavelengths in the WDM input signal using a fourth plurality of filtering elements optically coupled to the input waveguide, the fourth plurality of possible wavelengths being different than the third plurality of possible wavelengths;

generating a fourth detector signal in response to the light coupled out of the input waveguide by the fourth plurality of filtering elements; and generating a second bit in a demodulated signal based at least in part on comparing the third detector signal and the fourth detector signal.

19. The method of claim 18, wherein:
the first plurality of possible wavelengths comprises a first wavelength $\lambda_1$ and a second wavelength $\lambda_2$;
the second plurality of wavelengths comprises a third wavelength $\lambda_3$ and a second wavelength $\lambda_4$;
the third plurality of possible wavelengths comprises the first wavelength $\lambda_1$ and the third wavelength $\lambda_3$; and
the fourth plurality of possible wavelengths comprises the second wavelength $\lambda_2$ and the fourth wavelength $\lambda_4$.

20. The method of claim 18, wherein the first split ratio is substantially equal to 0.5 and the second split ratio is substantially equal to 1.

21. The method of claim 14, further comprising:
transmitting the light at each of the first plurality of possible wavelengths in the WDM input signal coupled out by the first plurality of filtering elements through a variable optical attenuator before generating the first bit in the demodulated signal.

22. The method of claim 14, further comprising:
coupling out a reference portion of the input signal before coupling out the light at each of the first plurality of possible wavelengths in the WDM input signal to provide reference information for the demodulated signal, wherein the reference portion of the input signal is substantially equal to or less than 0.25.

23. The method of claim 14, further comprising:
detuning at least one filtering element in the first plurality of filtering elements so as to balance a power ratio of the first detector signal to the second detector signal.

* * * * *